(12) United States Patent
Ukai et al.

(10) Patent No.: US 7,749,950 B2
(45) Date of Patent: Jul. 6, 2010

(54) STAIN-PROOFING AGENT AND BUILDING BOARD USING SAME

(75) Inventors: Masanori Ukai, Nagoya (JP); Hiroyuki Yamauchi, Nagoya (JP); Yasuhisa Imanishi, Nagoya (JP)

(73) Assignee: Nichiha Corporation, Nagoya-shi (JP)

( * ) Notice: Subject to any disclaimer, the term of this patent is extended or adjusted under 35 U.S.C. 154(b) by 557 days.

(21) Appl. No.: 11/480,410

(22) Filed: Jul. 5, 2006

(65) Prior Publication Data

US 2007/0026155 A1 Feb. 1, 2007

(30) Foreign Application Priority Data

| Jul. 29, 2005 | (JP) | 2005-219990 |
| Jul. 29, 2005 | (JP) | 2005-219991 |
| Jul. 29, 2005 | (JP) | 2005-219992 |

(51) Int. Cl.
*C11D 1/00* (2006.01)
*B32B 18/00* (2006.01)

(52) U.S. Cl. .................. 510/282; 428/446; 442/93

(58) Field of Classification Search ........... 428/446, 428/526, 530, 532, 533–536, 537.1, 537.5, 428/537.7, 323, 325, 331
See application file for complete search history.

(56) References Cited

U.S. PATENT DOCUMENTS

| 2,173,085 A * | 9/1939 | Cummins ................ 502/410 |
| 3,470,104 A * | 9/1969 | Domas ................... 252/188.1 |
| 5,484,647 A * | 1/1996 | Nakatani et al. ........... 428/209 |
| 2005/0112365 A1 * | 5/2005 | Hayashida et al. ......... 428/336 |

FOREIGN PATENT DOCUMENTS

| JP | 52-36124 | 3/1977 |
| JP | 55-056177 A | 4/1980 |
| JP | 01-225544 A | 9/1989 |
| JP | 05-156177 A | 6/1993 |
| JP | 05-202313 A | 8/1993 |
| JP | 6-71219 | 3/1994 |
| JP | 07-082398 A | 3/1995 |
| JP | 07-096575 A | 4/1995 |
| JP | 10-183379 A | 7/1998 |
| JP | 10-330646 A | 12/1998 |

(Continued)

*Primary Examiner*—David R Sample
*Assistant Examiner*—Nicole T Gugliotta
(74) *Attorney, Agent, or Firm*—Birch, Stewart, Kolasch & Birch, LLP

(57) ABSTRACT

An object of the present invention is to provide a durable excellent stain-proofing property to the surface of a coating formed on a substrate surface of a building board without deteriorating the surface of the coating. The present invention also, provides a stain-proofing agent containing silica fine particles, an aqueous solvent and, as a stain-proofing improver, an alkali metal compound and/or an alkaline earth metal compound and/or a phosphorus compound and/or a clay mineral. The present invention also provides a building board having an excellent stain-proofing property prepared by applying a coating composition onto the surface of a substrate to form a coat, and then applying a stain-proofing agent onto the coat while the coat is in an unhardened state or applying a stain-proofing agent onto the coat after subjecting the coat to a roughening treatment to enhance the adhesion of the stain-proofing layer to the coat.

9 Claims, 30 Drawing Sheets
(30 of 30 Drawing Sheet(s) Filed in Color)

FOREIGN PATENT DOCUMENTS

| | | |
|---|---|---|
| JP | 11-080615 A | 3/1999 |
| JP | 11-140432 A | 5/1999 |
| JP | 11-246787 A | 9/1999 |
| JP | 2001-049147 A | 2/2001 |
| JP | 2001-294849 A | 10/2001 |
| JP | 2002-330769 | 11/2002 |
| JP | 2002-336768 | 11/2002 |
| JP | 2002-338943 | 11/2002 |
| JP | 2003-026959 A | 1/2003 |
| JP | 2003-055581 A | 2/2003 |
| JP | 2003-073651 A | 3/2003 |
| JP | 2004-099912 A | 4/2004 |
| JP | 2004-315730 A | 11/2004 |
| JP | 2005-095815 A | 4/2005 |
| JP | 2005-095816 A | 4/2005 |
| JP | 2006-096835 A | 4/2006 |

* cited by examiner

STAIN-PROOFING AGENT AND BUILDING BOARD USING SAME

CROSS-REFERENCE TO RELATED APPLICATION

JP Patent Application No.2005-219990
JP Patent Application No.2005-219991
JP Patent Application No.2005-219992

BACKGROUND OF THE INVENTION

1. Field of the Invention

The present invention relates to a stain-proofing agent to be used for stain-proofing treatment of the surfaces of, for example, wood fiber cement boards, calcium silicate boards, cement (concrete) boards, metal plates or boards, or glass plates or boards, as well as to a building board whose surface is treated with the stain-proofing agent.

2. Description of the Prior Art

Building boards such as, for example, external wall materials are generally coated with a coating composition on their surfaces. It has been proposed to apply thereto a stain-proofing agent which forms a stain-proofing film having a self-cleaning function to remove stains adhered to the surfaces after attachment.

As this kind of stain-proofing agents has been used such an agent which forms a super hydrophilic stain-proofing film on the surface to be treated. Upon application of the stain-proofing agent onto the surface of a substrate, a super hydrophilic stain-proofing film is formed thereon. When stains are adhered to the surface of the substrate, water applied to the surface is absorbed by the super hydrophilic stain-proofing film and, as a result, the stains float on the water and are washed away together with the water (i.e. self-cleaning effect).

In order to form a super hydrophilic stain-proofing film on the surface of a substrate, a stain-proofing agent mainly consisting of an aqueous dispersion of silica fine particles (colloidal silica) has been hitherto used.

For example, Japanese Laid-open Patent Publication No. 6-71219 gazette (JP 6-71219 A) discloses a method for forming a stain-proofing film which comprises applying an aqueous dispersion of colloidal silica having an average particle diameter of not more than 100 nm to a coat formed from an aqueous emulsion of a synthetic resin to form a film of colloidal silica on the surface of the coat.

Japanese Laid-open Patent Publication No. 2002-338943 gazette (JP 2002-338943 A) discloses a method for forming a stain-proofing layer which comprises applying a liquid containing colloidal silica and an alumina/aluminum-magnesium composite oxide to a coated surface for providing the coated surface with water-proof and alkali-proof properties.

The above-described silica fine particles give super hydrophilicity to the treated surface of a substrate owing to the presence of silanol groups on the surface of the particles.

The above-described silica fine particles contain a number of vicinal silanol groups in which silanol groups present on the surface of the particles are adjacent closely to one another. Since the vicinal silanol groups are mutually hydrogen-bonded, the concentration of free silanol group (i.e. single silanol group) which participates in hydrophilicity is not so high. Thus, in order to obtain a stain-proofing film having a high hydrophilicity, it is necessary to increase the concentration of silica fine particles in the aqueous dispersion.

However, a high concentration of silica particles is disadvantageous in that the resulting aqueous dispersion becomes expensive and uneven application of the aqueous dispersion results in a whitish pool of silica fine particles, whereby providing a color different from the inherent color of the coat.

Furthermore, it is necessary that the above-described stain-proofing film has a good adhesion to the coat of a coating composition formed on the surface of a building board.

If the adhesion between the stain-proofing film and the coat is low, the stain-proofing film is peeled off at an early stage to fail to provide a long-term effect and durable stain-proofing effect.

In an attempt to enhance the adhesion between a stain-proofing film and a coat, there have been proposed a method for oxidizing the coat by means of flame or an oxidizing agent (e.g. Japanese Laid-open Patent Publication No. 2002-336768 gazette), and a method for applying a stain-proofing agent after the surface of the coat is heated to 60° C. or more (e.g. Japanese Laid-open Patent Publication No. 2002-330769 gazette).

However, if a coat on the surface of a building board which is required to have a molded surface and a delicate texture is treated with flame or an oxidizing agent, the coat may deteriorate to discolor and lose glaze, whereby reducing the commercial value of the building board, and generation of peeling off, cracks, and pinholes may cause deterioration in the performance of the board.

In addition, heating of the surface of the coat to 60° C. or more is difficult in terms of temperature control, may cause uneven treatment, and is not favorable in view of energy saving.

SUMMARY OF THE INVENTION

Under such circumstances, the problem to be solved by the present invention is to provide a stain-proofing agent which provides an excellent stain-proofing property and a good adhesion between a stain-proofing film and a coat even if the concentration of silica fine particles is not increased, as well as a building board obtained by using the agent.

The present invention provides, as a means to solve the above-mentioned conventional problem, a stain-proofing agent which forms a super hydrophilic stain-proofing film upon application to the surface of a substrate of a building board, and comprises silica fine particles, an aqueous solvent, and additionally a stain-proofing improver selected from the group consisting of an alkali metal compound, an alkaline earth metal compound, a phosphorus compound, a clay mineral and mixtures thereof.

The present invention also provides a building board obtained by applying a coating composition onto the surface of a substrate to form a coat, and applying the above-described stain-proofing agent onto the coat while the coat is in a unhardened state or after the coat is subjected to roughening treatment.

As the effect brought about by the stain-proofing agent according to the present invention, an enhanced stain-proofing effect can be exhibited without increasing the concentration of silica fine particles.

In addition, durable stain-proofing treatment is ensured without deteriorating the coat on the surface of a substrate of a building board.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
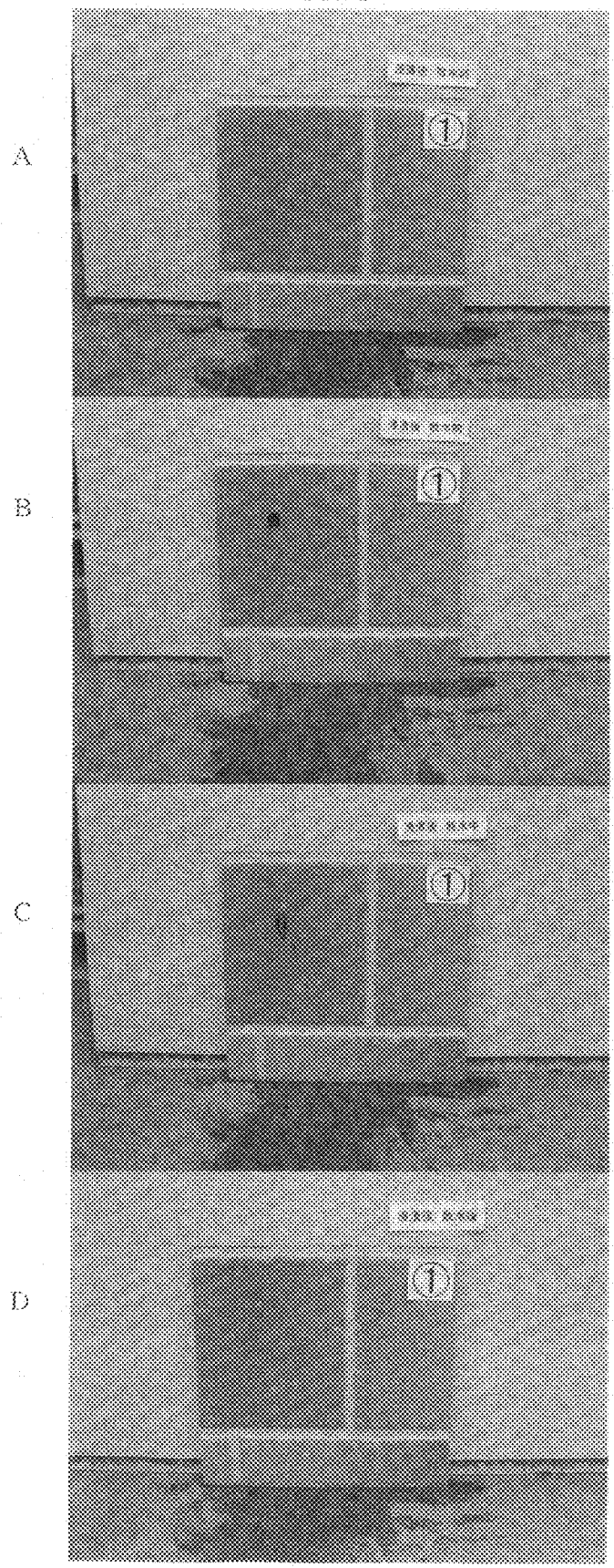
FIG. 1 is a photograph of a building board used in place of a drawing to show the test results of the stain-proofing effect of an example (Sample 1) in Embodiment 1 according to the present invention. In the photograph, the mark A is a photograph of the board after application of a stain-proofing agent and before the test; the mark B is a photograph of the board when it is applied with a stained liquid after application of a stain-proofing agent followed by immersion in water; the mark C is a photograph of the board during water-spraying to dirty parts of the board; and the mark D is a photograph of the board after water-spraying.

The invention will be explained below in detail.

At first, each of the raw materials of the stain-proofing agent is explained.

[Silica Fine Particles]

The silica fine particles used in the present invention are desirably amorphous. Examples of such amorphous silica fine particles include colloidal silica, silica gel, silica sol and fumed silica. Particularly, colloidal silica and fumed silica are desirably used.

Primary particle diameter of colloidal silica is in a range of from several nanometers to several tens of nanometers. However, when it is dispersed in an aqueous solvent, the colloidal particles may aggregate to form secondary particles of several hundreds to several tens of nanometers in diameter.

The fumed silica can be prepared by burning and hydrolyzing a volatile silicon compound such as silicon tetrachloride in a gas phase in, for example, oxygen-hydrogen flame.

Primary particle diameter of the fumed silica is in a range of from 7 to 40 nm. However, when it is dispersed in an aqueous solvent, the particles may associate to form a network structure and provide secondary particles of several hundreds of nanometers (about 500 nm) in diameter.

The fumed silica has a specific surface area in a range of from about 500,000 to 2,000,000 $cm^2/g$ and contains 2 to 3 single silanol groups per $nm^2$ Thus, the fumed silica has a high surface activity and imparts a high super hydrophilicity to the surface of a substrate.

[Aqueous Solvent]

As the aqueous solvent used in the present invention, mainly water is used alone. However, it is preferable to use a water-soluble organic solvent such as a water-soluble alcohol in addition to water for the purpose of rapid drying after application.

Examples of the alcohol used in the present invention include methanol, ethanol and isopropanol.

[Stain-proofing Improver]

The stain-proofing improver to be added to enhance or improve the stain-proofing property of the stain-proofing agent of the present invention consists of an alkali metal compound and/or an alkaline earth metal compound and/or a phosphorus compound and/or a clay mineral.

[Alkali Metal Compound]

Examples of the alkali metal compounds used in the present invention include oxides or hydroxides of alkali metals such as lithium, sodium and potassium; salts of these alkali metals with an inorganic acid such as hydrochloric acid, sulfuric acid, carbonic acid, phosphoric acid, nitric acid or silicic acid; and salts of these alkali metals with an organic acid such as acetic acid, formic acid or oxalic acid.

[Alkaline Earth Metal Compound]

Examples of the alkaline earth metal compounds used in the present invention include oxides or hydroxides of alkaline earth metals such as calcium and magnesium; salts of these alkaline earth metals with an inorganic acid such as hydrochloric acid, sulfuric acid, carbonic acid, phosphoric acid, nitric acid or silicic acid; salts of these alkaline earth metals with an organic acid such as acetic acid, formic acid or oxalic acid; and inorganic materials which contain an alkaline earth metal such as silicofluorides, dolomite and portland cement.

[Phosphorus Compound]

Examples of the phosphorous compounds used in the present invention include ammonium or metal salts of phosphoric acid, apatites and hydroxyapatites.

[Clay Mineral]

Examples of the clay minerals used in the present invention include kaolinite, halloysite, montmorillonite, illite, vermiculite, chlorite and bentonite.

[Dispersing Agent]

It is desirable to add a dispersing agent to the stain-proofing agent of the present invention.

As the dispersing agent may be used any of usual anionic, nonionic and cationic surfactants.

Examples of the surfactants include anionic surfactants such as higher alcohol sulfates (Na salts or amine salts), alkylally sulfonates (Na salts or amine salts), alkylnaphthalene sulfonates (Na salts or amine salts), alkylnaphthalene sulfonate condensates, alkyl phosphates, dialkyl sulphosuccinates, rosin soaps, and fatty acid salts (Na salts or amine salts); nonionic surfactants such as polyoxyethylene alkyl ethers, polyoxyethylene alkyl phenol ethers, polyoxyethylene alkyl esters, polyoxyethylene alkyl amines, polyoxyethylene alkylol amines, polyoxyethylene alkyl amides, sorbitan alkyl esters, and polyoxyethylene sorbitan alkyl esters; and cationic surfactants such as octadecyl amine acetates, acetates of imidazoline derivatives, polyalkylene polyamine derivatives or their salts, octadecyltrimethyl ammonium chloride, trimethylaminoethylalkyl amide halogenides, alkyl pyridinium sulfates, and alkyltrimethyl ammonium halogenides.

A mixture of two or more of the surfactants may be used.

These examples do not restrict the present invention.

The surfactant lowers surface tension of the stain-proofing agent of the present invention, favorably disperses the silica fine particles in the agent, and increases affinity to the underlying coat.

[Third Component]

The stain-proofing agent of the present invention may contain components other than the above-described components, such as organosilicon compounds, e.g. polyorganoalkoxysilane or organopolysiloxane, or inorganic fillers, e.g. aluminum hydroxide, titanium oxide, iron oxides, zinc oxide, alumina, silica, diatomaceous earth, clay, mica, glass fibers, carbon fibers, white carbon, carbon black, iron powder, aluminum powder, stone dust or zirconia.

[Formulation]

The stain-proofing agent of the present invention contains usually 0.1 to 10% by mass, preferably 0.5% to 6% by mass, of silica fine particles, not more than 10% by mass of an alcohol when it is added, usually 0.1 to 2.0% by mass of a stain-proofing improver, 0.05 to 1.0% by mass of a surfactant, and usually 0.1 to 2.0% by mass of a third component.

If the alcohol is contained in an amount of more than 10% by mass, volatility of the resulting solvent becomes so high as to adversely affect coating operation.

If the surfactant is contained in an amount of less than 0.05% by mass, surface tension-lowering effect and silica fine particle-dispersing effect brought about by the surfactant does not become remarkable whereas if it is contained in an amount of more than 1.0% by mass, the resulting stain-proofing layer is adversely affected in terms of strength, water resistance, durability and the like.

Thus, it is desirable that the agent has a surface tension of not more than 20 dyne/cm at 25° C.

[Building Board Substrate]

As a building board substrate to be applied with the stain-proofing agent of the invention are used wood fiber cement boards, pulp cement boards, fiber reinforced cement boards, extrusion molded cement boards or fiber reinforced cement sidings which are prepared by molding and hardening a mixture mainly consisting of a wood reinforcing material such as wood flake, wood fiber bundle, wood pulp, wood-wool, or wood flour and a hydraulic cement material. The surface of the substrate may have a concavo-convex pattern formed by embossing or the like.

In addition to the above-described substrates, the substrates which are usable in the present invention include, for example, concrete boards, metal plates or boards and glass plates or boards.

[Coat]

Coating is applied onto the surface of the substrate.

The coating composition used for the coating includes usually a solvent-type or aqueous emulsion-type composition containing an acrylic resin, an acryl-silicone resin, an acryl-urethane resin or an acryl-silicone resin as a vehicle.

Usually, three-ply coating consisting of under coating, intermediate coating and top coating, or two-ply coating consisting of under coating and top coating is applied.

[Unhardened State]

The "coat in an unhardened state" means an undried state in which a solvent or water is not evaporated and merely a thin film is formed in an undried state on the surface of a substrate in the case where a solvent type or aqueous emulsion type coating composition is used for coating, or the state in which a resin vehicle or an inorganic vehicle in a coating composition is not hardened, i.e. in an unhardened state, in the case where a solvent-free type coating composition is used.

The undried state is usually realized immediately after or within several tens of seconds after formation of the coat by coating, preferably immediately after or within 10 seconds after formation of the coat.

When a solvent type or aqueous emulsion type coating composition is used, the concentration of solid content increases from 30-50% by mass to 60-80% by mass during this period.

In the unhardened state of the coat, silica fine particles in the stain-proofing agent slightly gets into the coat, and thus the adhesive force of the formed stain-proofing film to the coat is enhanced and the stain-proofing film firmly adheres to the coat without causing mixing of the stain-proofing film and the coat. Thus the stain-proofing film does not adversely affect the coat.

[Roughening Treatment]

The roughening treatment to be used in the present invention is desirably such treatment that does not deteriorate the coat, and includes shot blast, sanding and corona discharge treatment.

Among them, corona discharge treatment is recommended because it provides a very finely roughened surface, scarcely deteriorates the coat and does not change the appearance of the coat.

The roughening treatment may be effected either after hardening of the coat or immediately after coating where a thin film is attached in an unhardened state to the surface of the substrate. When the roughening treatment is effected while the coat is in the unhardened state, a discharge weaker than that in the case where the treatment is effected after hardening of the coat is effected.

By the roughening treatment, the specific surface area of the coat is increased and adhesion between the coat and a stain-proofing film to be formed on the coat is enhanced due to anchor effect.

It is preferable in view of safety to conduct the corona discharge treatment in the space different from the coating space particularly in the case where a solvent type coating composition is used.

[Super Hydrophilic Stain-proofing Film]

A method desirable for applying the stain-proofing agent to the surface of the substrate includes spray coating.

The spray coating includes, for example, low pressure airless spray coating, coating by means of a Bell type coating machine and electrostatic coating.

The other coating methods such as brushing, roll coater coating and knife coater coating may be used.

In the spray coating, the stain-proofing agent is atomized to mist and the mist adheres to the surface of the substrate with a concavo-convex pattern, whereby the agent is readily fixed to the surface.

Incidentally, the building boards are usually subjected to sealer coating, drying by means of a dryer, intermediate coating, drying by means of a dryer, top coating, drying by means of a dryer, clear coating and drying by means of a dryer. Thus, heat from the dryer accumulates, whereby the boards can be kept at about 50° C. without necessity of preheating.

Since the stain-proofing agent of the present invention contains, in addition to the silica fine particles which impart super hydrophilic property to the surface of the substrate, an alkali metal compound and/or an alkaline earth metal compound and/or a phosphorus compound and/or a clay mineral as a stain-proofing improver, super hydrophilic property of the silica fine particles is enhanced, durability of the resulting stain-proofing film is improved, and enhancement of fixing and adhesion of the silica fine particles to the coat is promoted.

DESCRIPTION OF THE PREFERRED EMBODIMENTS

Embodiment 1

As Embodiment 1 according to the present invention, examples (Sample Nos. 1-8) and a comparison (Sample No. 9) are shown below.

The components shown in Table 1 were thrown into water to give a stain-proofing agent.

For dispersion of colloidal silica, a bead mill was used and then dispersion by means of ultrasound wave was effected for 40 minutes.

Incidentally, a commercially available colloidal silica dispersion (e.g. SNOWTEX (trade name), manufactured by Nissan Chemical Industries, Ltd.) may be used as it is.

Onto the surface of a wood fiber reinforced calcium silicate board (building board) of 50×40 mm was applied an aqueous styrene-acryl coating composition. After hardening the resulting coat, a stain-proofing agent having the composition shown in Table 1 was applied to the coat in an amount of 5 g/square shaku (about 5 g/sq. ft), and the coated board was dried at normal temperature for use in a test.

The comparison corresponds to a sample not containing a stain-proofing improver.

The building board subjected to the treatment with the stain-proofing agent was allowed to stand for one day after the stain-proofing treatment, immersed in warm water at 60° C. for ten days and was examined with regard to the stain-proofing effect before and after immersion in the warm water.

The stain-proofing effect was evaluated by applying a stained liquid which had been prepared by dispersing 1% by mass of carbon black in a machine oil to the stain-proofing agent-treated surface of the building board with an ink brush to stain the board, and then spraying water to the stained parts of the board to wash away the stains.

Evaluation criterion of the stain-proofing property is as follows:
o:stain scarcely remains
Δ:stain somewhat remains
×:stain remains.

The test results are shown in Table 1.

The photographs showing the test results are shown in FIGS. 1-9.

TABLE 1

| Component | | Sample No. | | | | | | | | |
| --- | --- | --- | --- | --- | --- | --- | --- | --- | --- | --- |
| | | Example | | | | | | | | Comparison |
| (% by mass) | | 1 | 2 | 3 | 4 | 5 | 6 | 7 | 8 | 9 |
| Colloidal silica | | 6 | 6 | 6 | 6 | 6 | 3 | 6 | 9 | 6 |
| Stain-proofing improver | | A*1 | B*1 | C*1 | D*1 | E*1 | F*1 | F*1 | F*1 | Non |
| Stain-proofing Property | Before immersion | ○ | ○ | ○ | ○ | ○ | ○ | ○ | ○ | ○ |
| | After immersion | ○ | ○ | ○ | ○ | ○ | Δ | ○ | ○ | X |

A*: Lithium metasilicate
B*: Magnesium silicate
C*: Magnesium oxide
D*: Hydroxyapatite
E*: Smectite
F*: Calcium silicate

EXAMPLE 1

Sample 1 of the example in which 1% by mass of lithium metasilicate is added as a stain-proofing improver provides a test result "stain scarcely remains" after immersion in warm water as shown in Table 1 and FIG. 1, which indicates improvement in the stain-proofing property.

EXAMPLE 2

Figure 2:
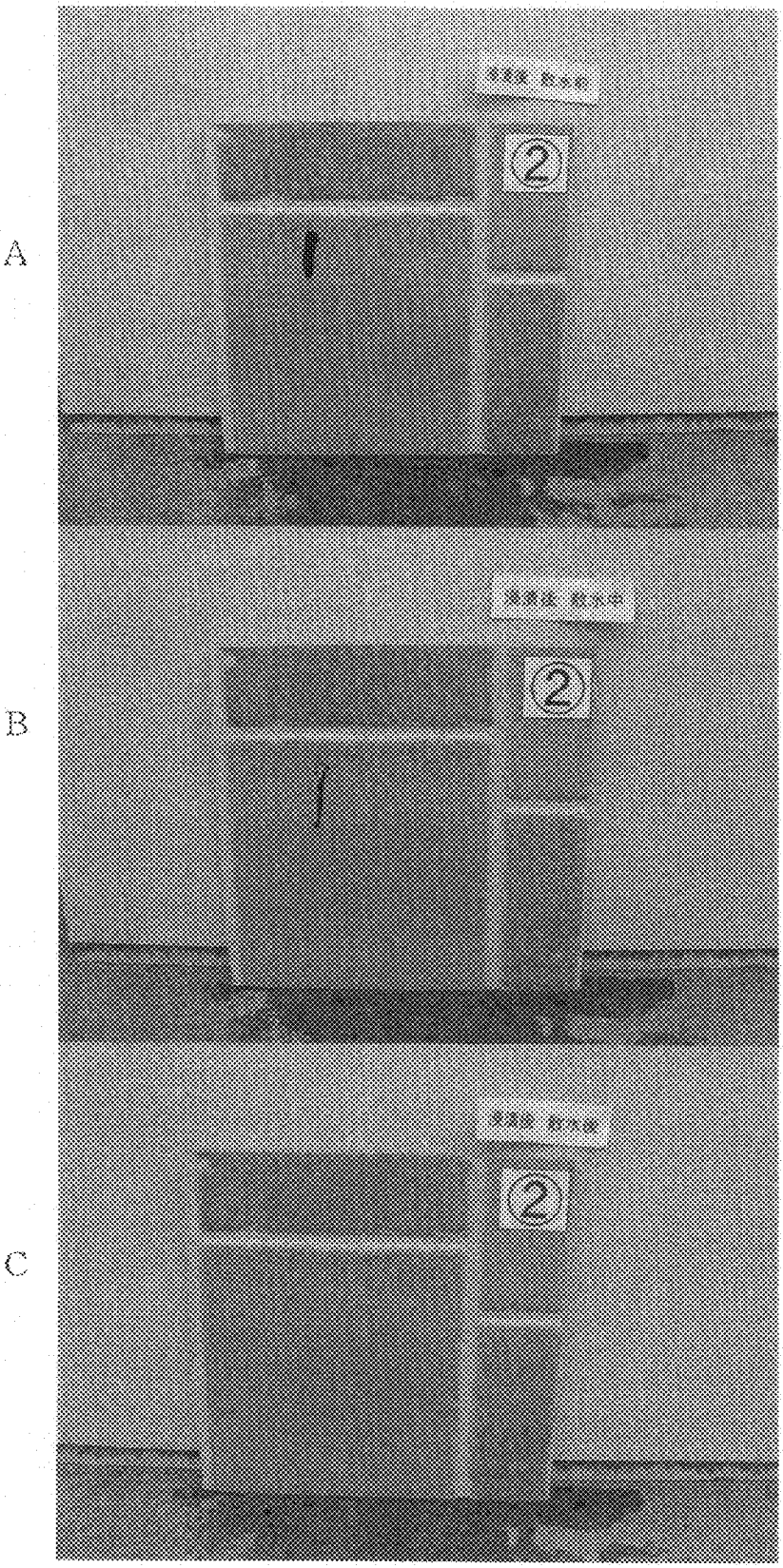
FIGS. 2-8 are photographs of building boards used in place of drawings to show the test results of the stain-proofing effects of examples (Samples 2-8) in Embodiment 1 according to the present invention. In each of the photographs, the mark A is a photograph of the board when it is applied with a stained liquid after application of a stain-proofing agent followed by immersion in water; the mark B is a photograph of the board during water-spraying to dirty parts of the board; and the mark C is a photograph of the board after water-spraying.

Sample 2 of the example in which 1% by mass of magnesium silicate is added as a stain-proofing improver provides a test result "stain scarcely remains" after immersion in warm water as shown in Table 1 and FIG. 2, which indicates improvement in the stain-proofing property.

EXAMPLE 3

Figure 3:
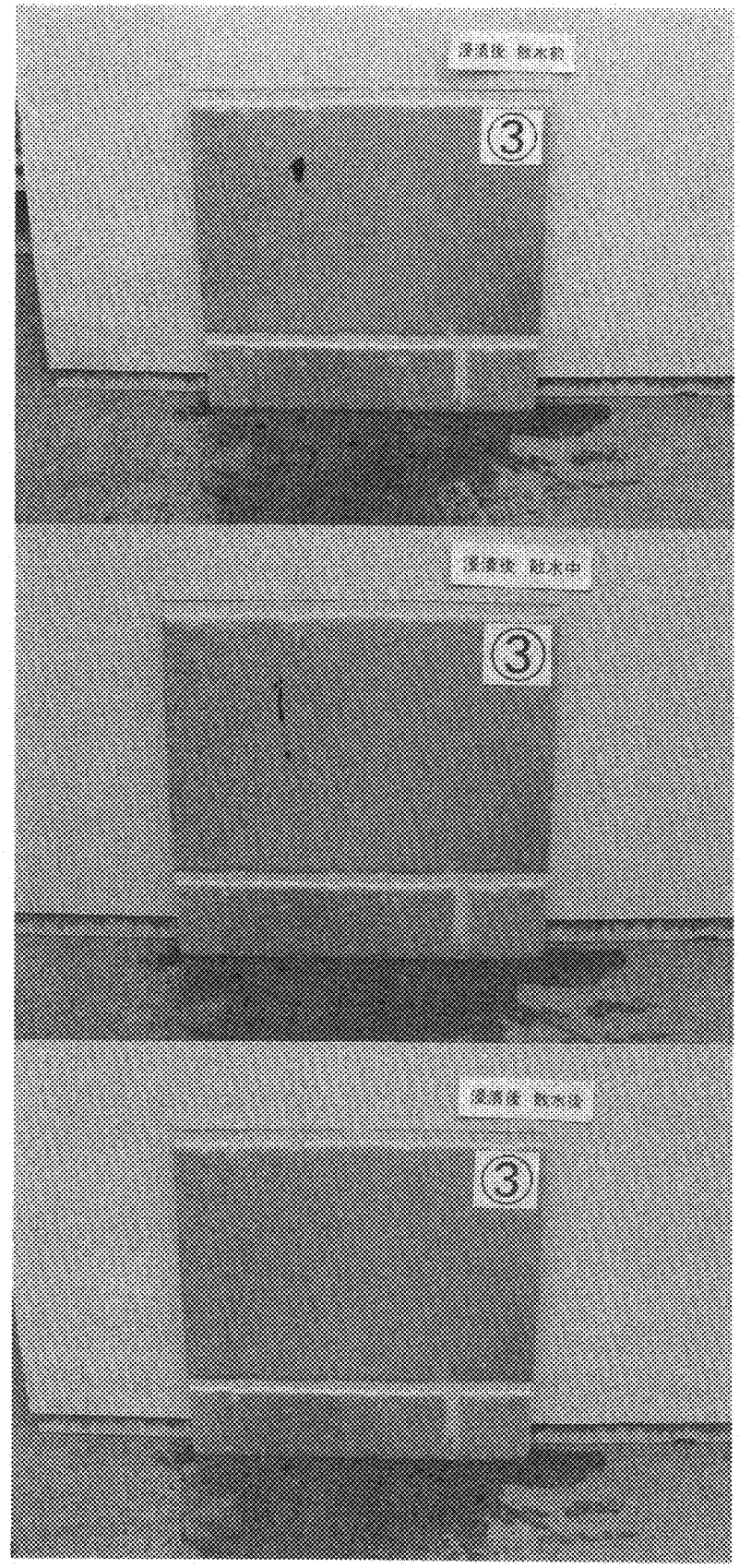

Sample 3 of the example in which 1% by mass of magnesium oxide is added as a stain-proofing improver provides a test result "stain scarcely remains" after immersion in warm water as shown in Table 1 and FIG. 3, which indicates improvement in the stain-proofing property.

EXAMPLE 4

Figure 4:
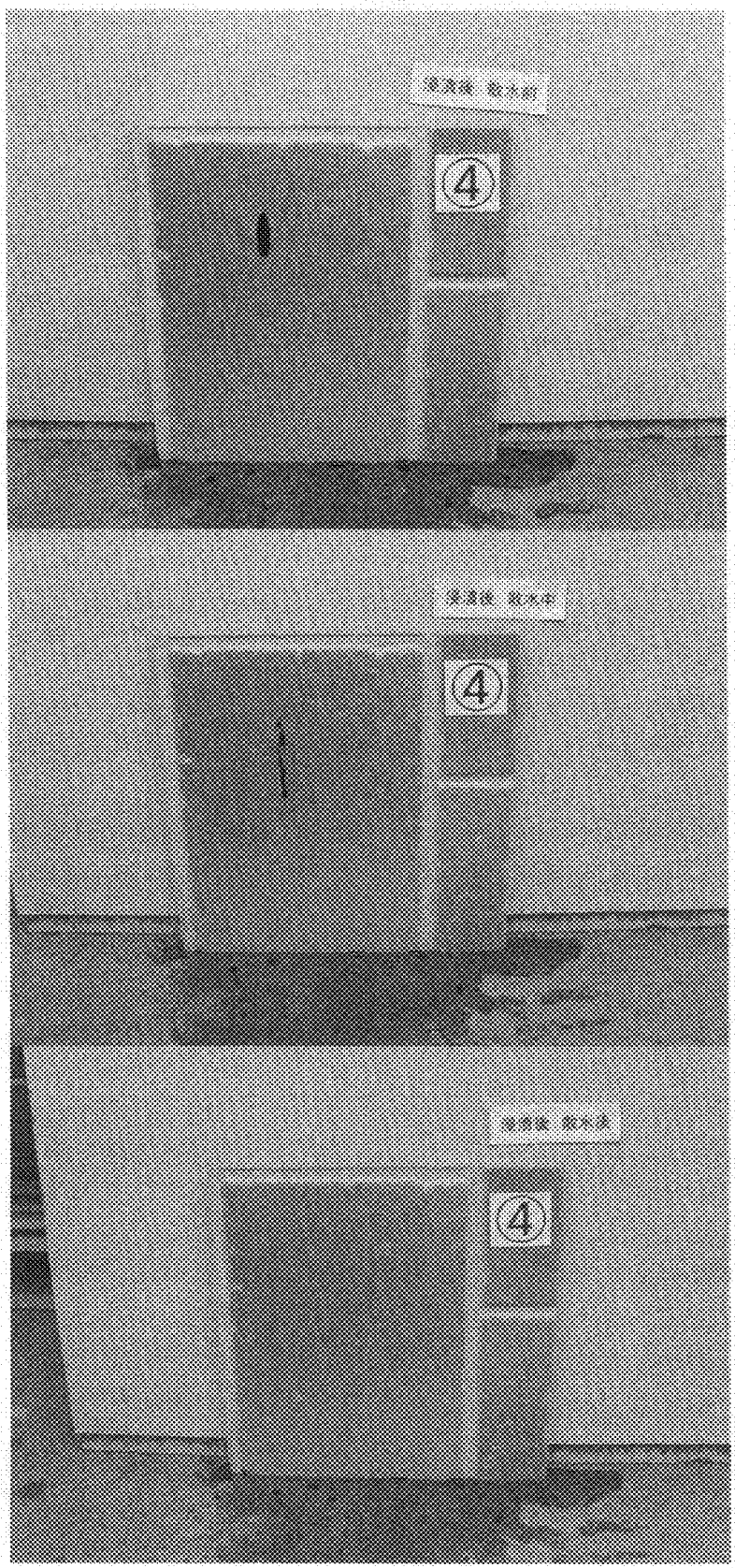
Figure 5:
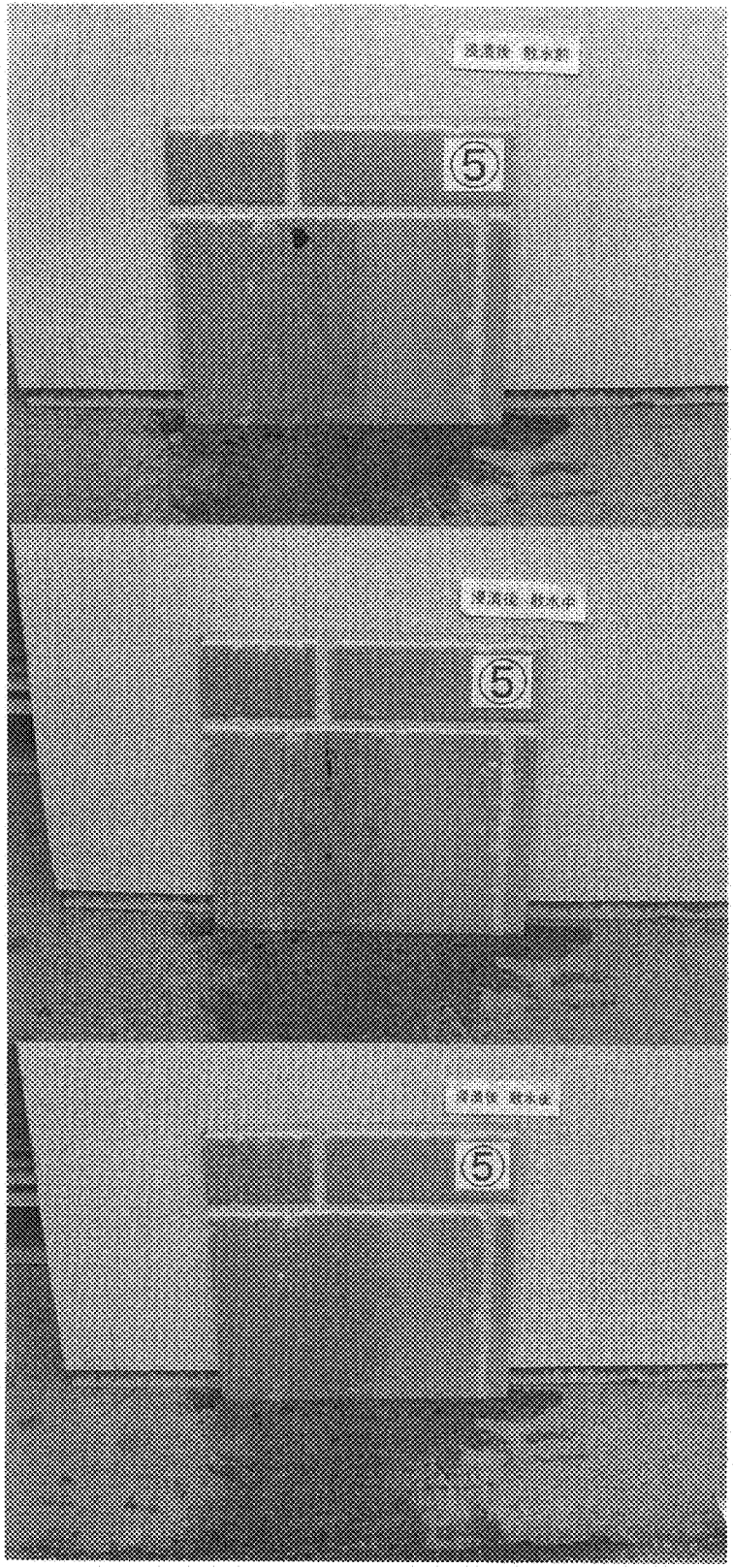
Figure 6:
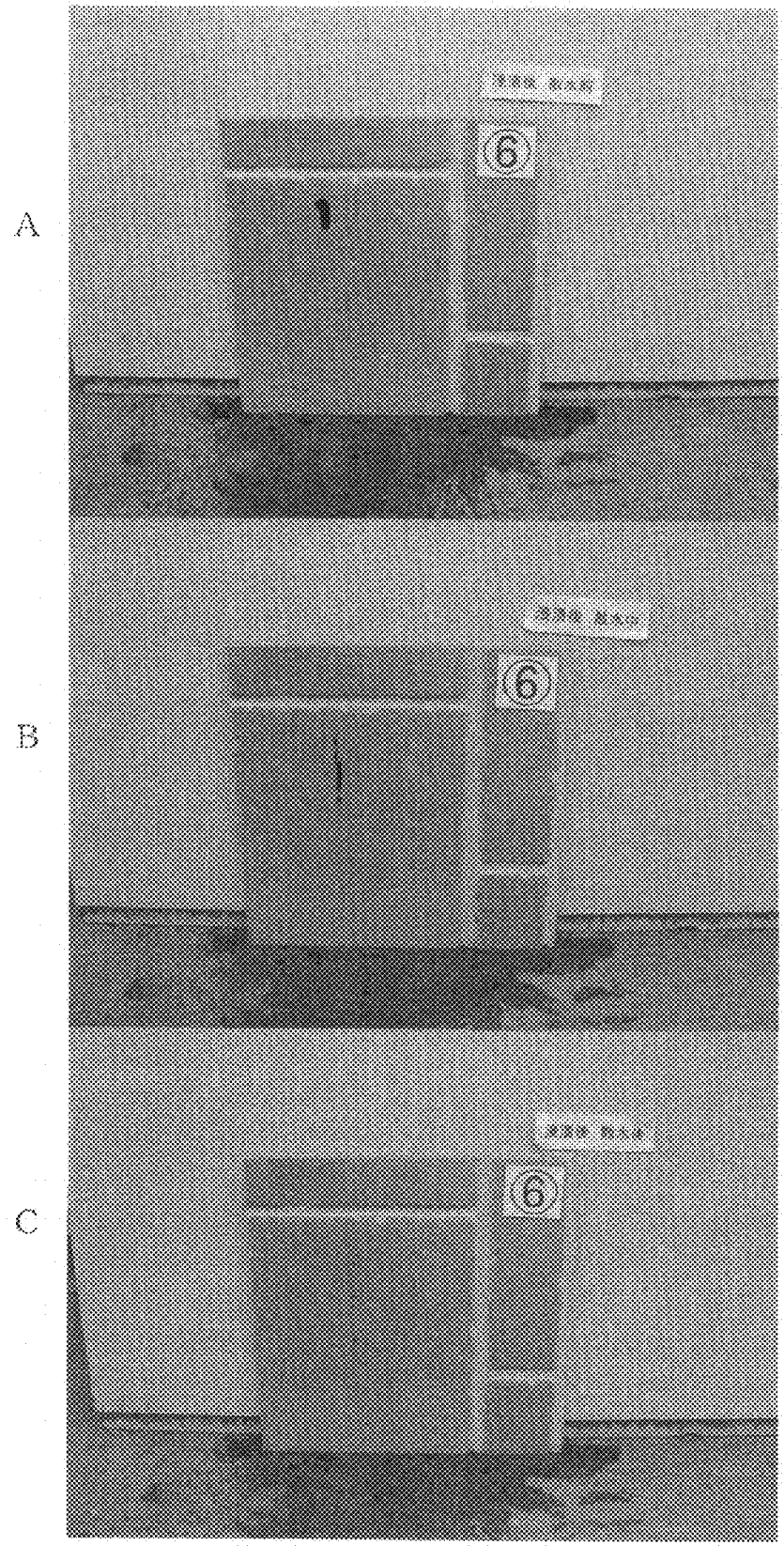
Figure 7:
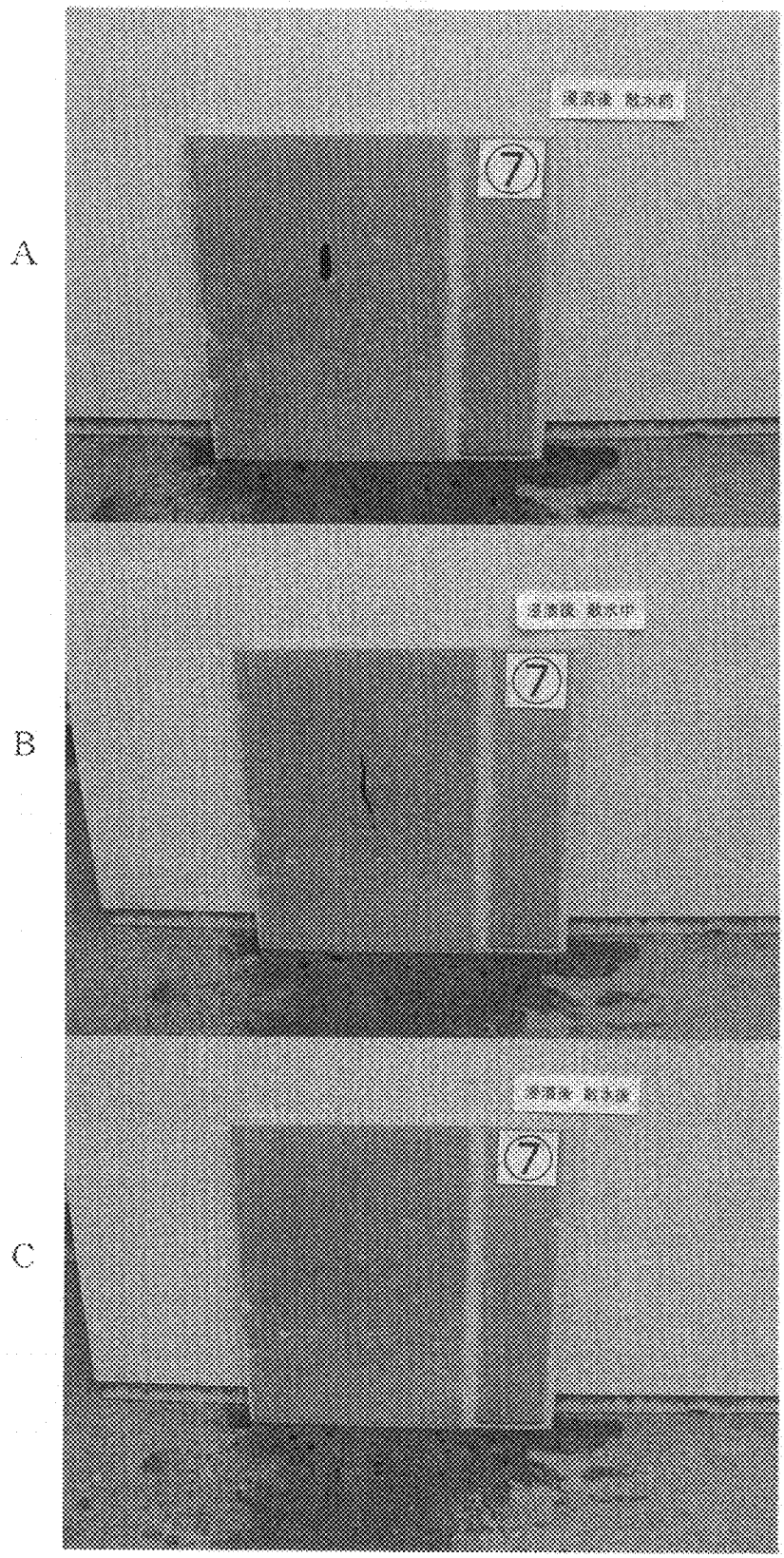
Figure 8:
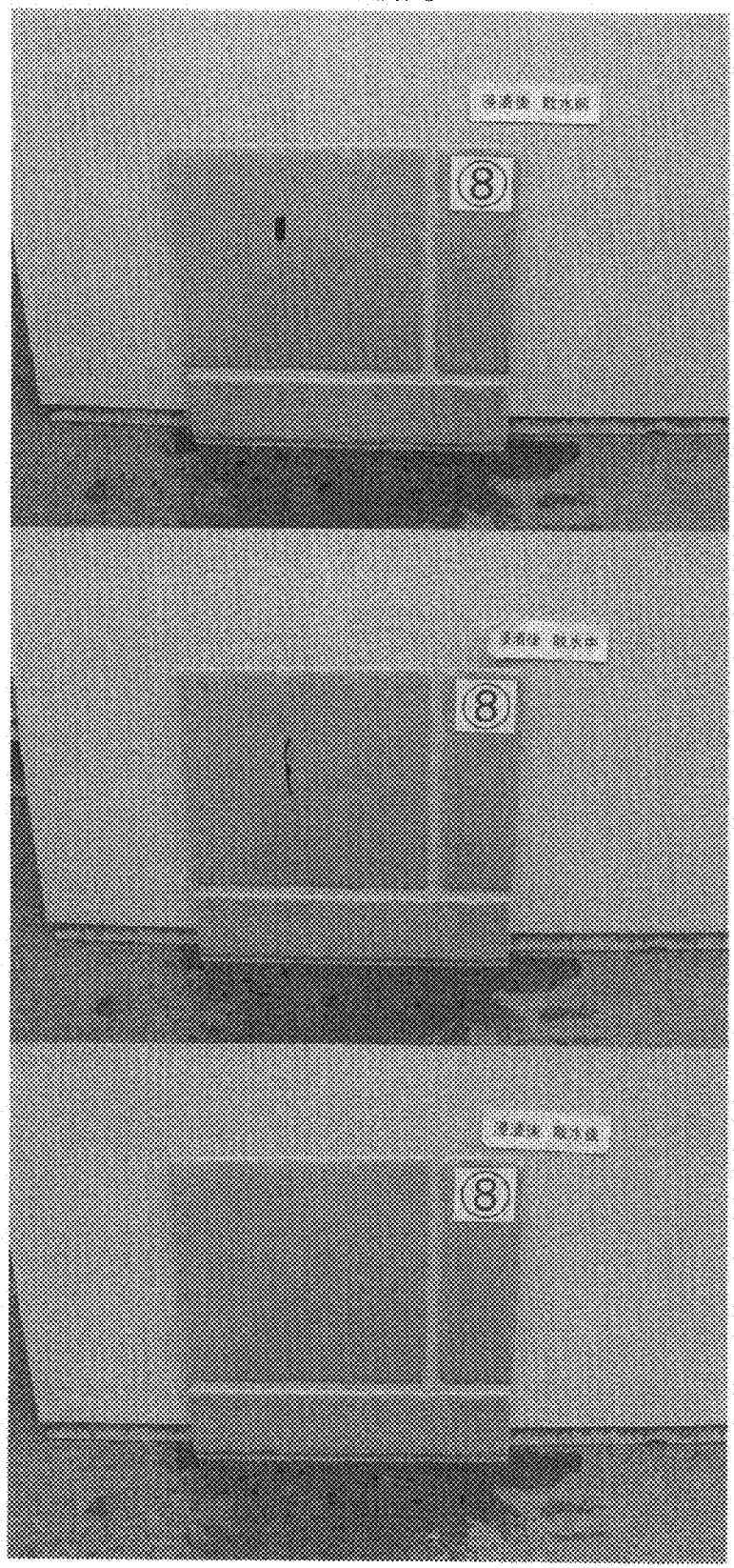
Figure 9:
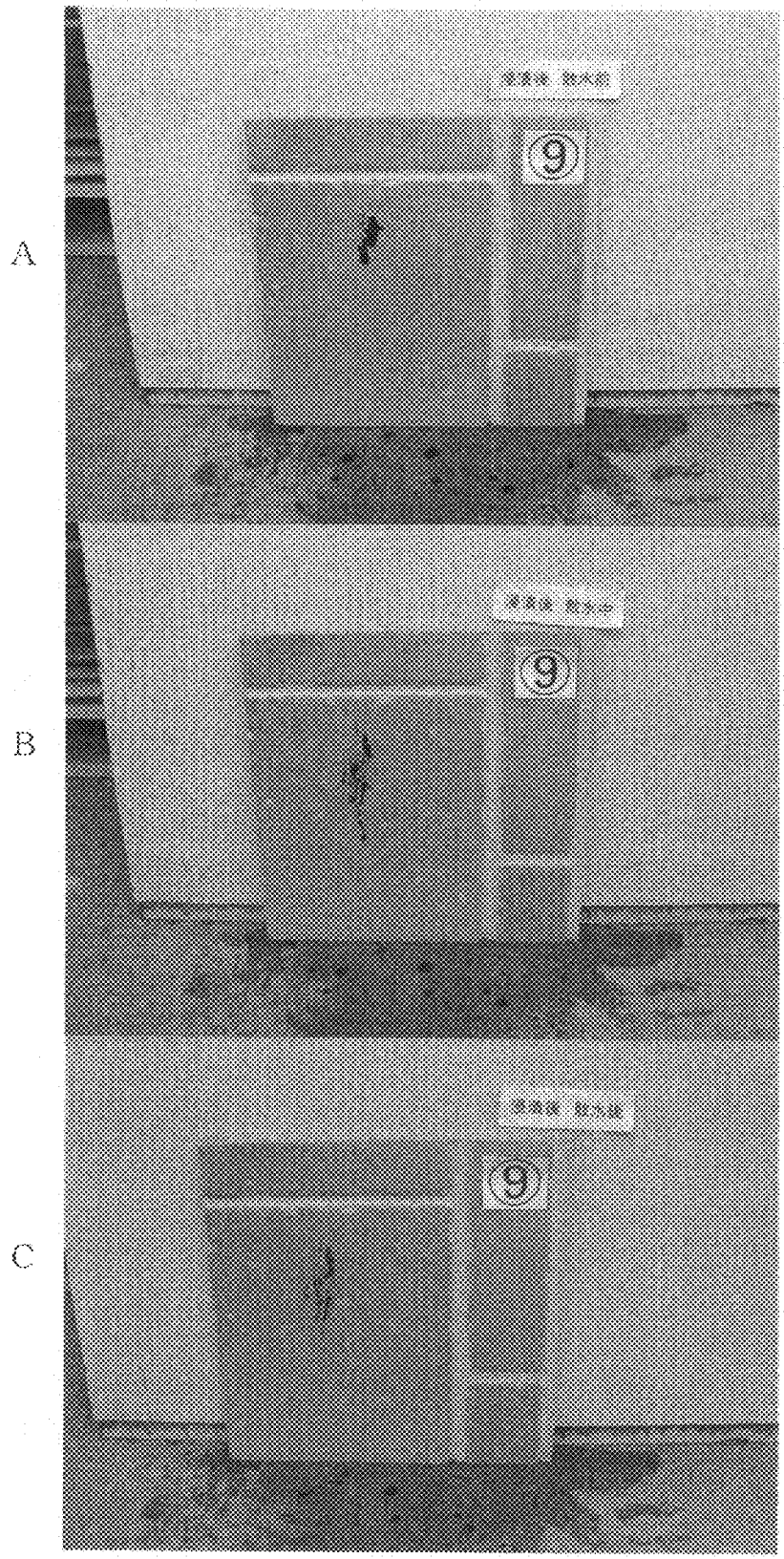
FIG. 9 is a photograph of a building board used in place of a drawing to show the test results of the stain-proofing effect of a comparison (Sample 9) in Embodiment 1 according to the present invention. In the photograph, the mark A is a photograph of the board when it is applied with a stained liquid after application of a stain-proofing agent followed by immersion in water; the mark B is a photograph of the board during water-spraying to dirty parts of the board; and the mark C is a photograph of the board after water-spraying.
Figure 10:
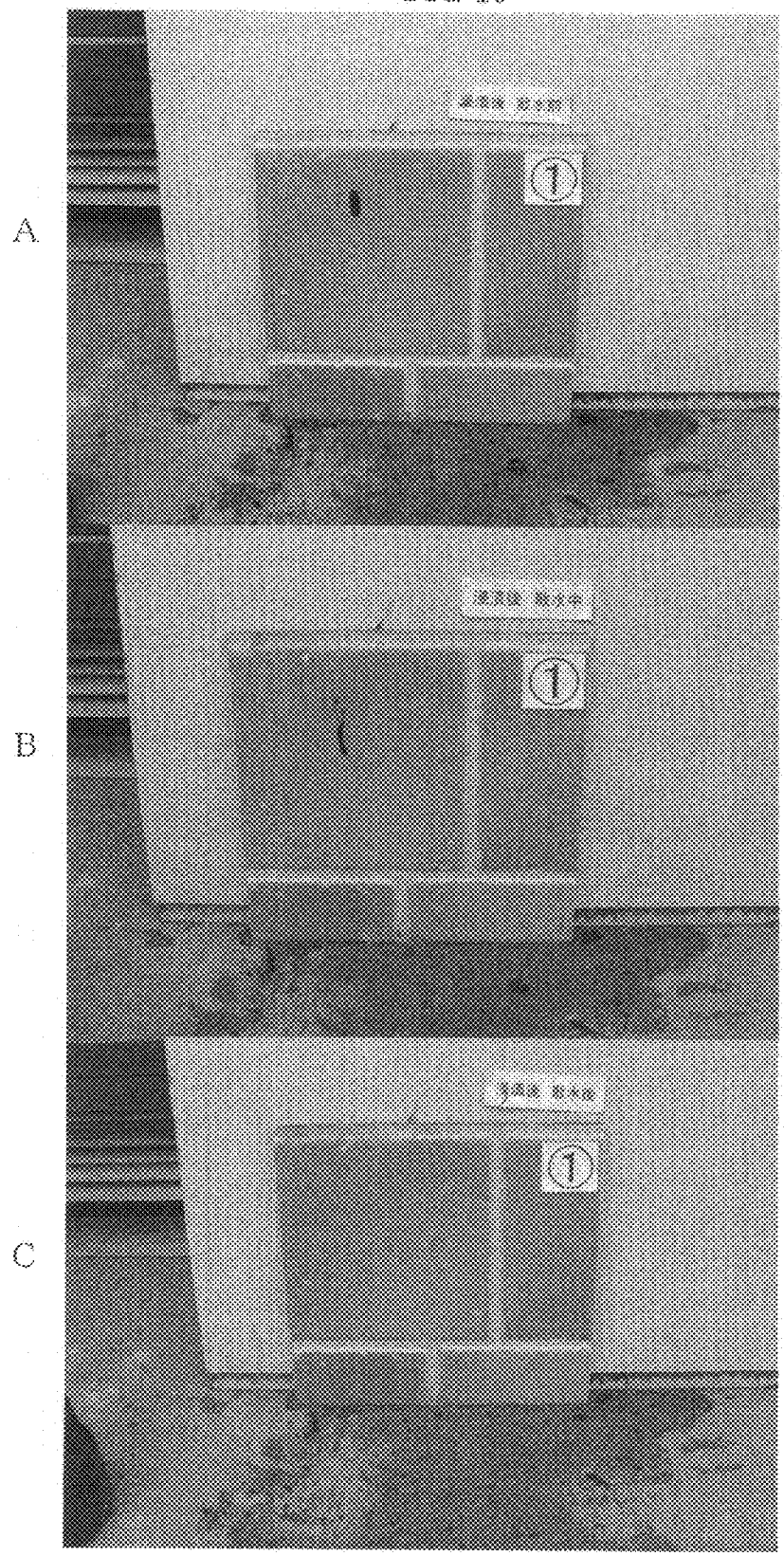
FIGS. 10-15 are photographs of building boards used in place of drawings to show the test results of the stain-proofing effects of examples (Samples 1-6) in Embodiment 2 according to the present invention. In each of the photographs, the mark A is a photograph of the board when it is applied with a stained liquid after application of a stain-proofing agent followed by immersion in water; the mark B is a photograph of the board during water-spraying to dirty parts of the board; and the mark C is a photograph of the board after water-spraying.
Figure 11:
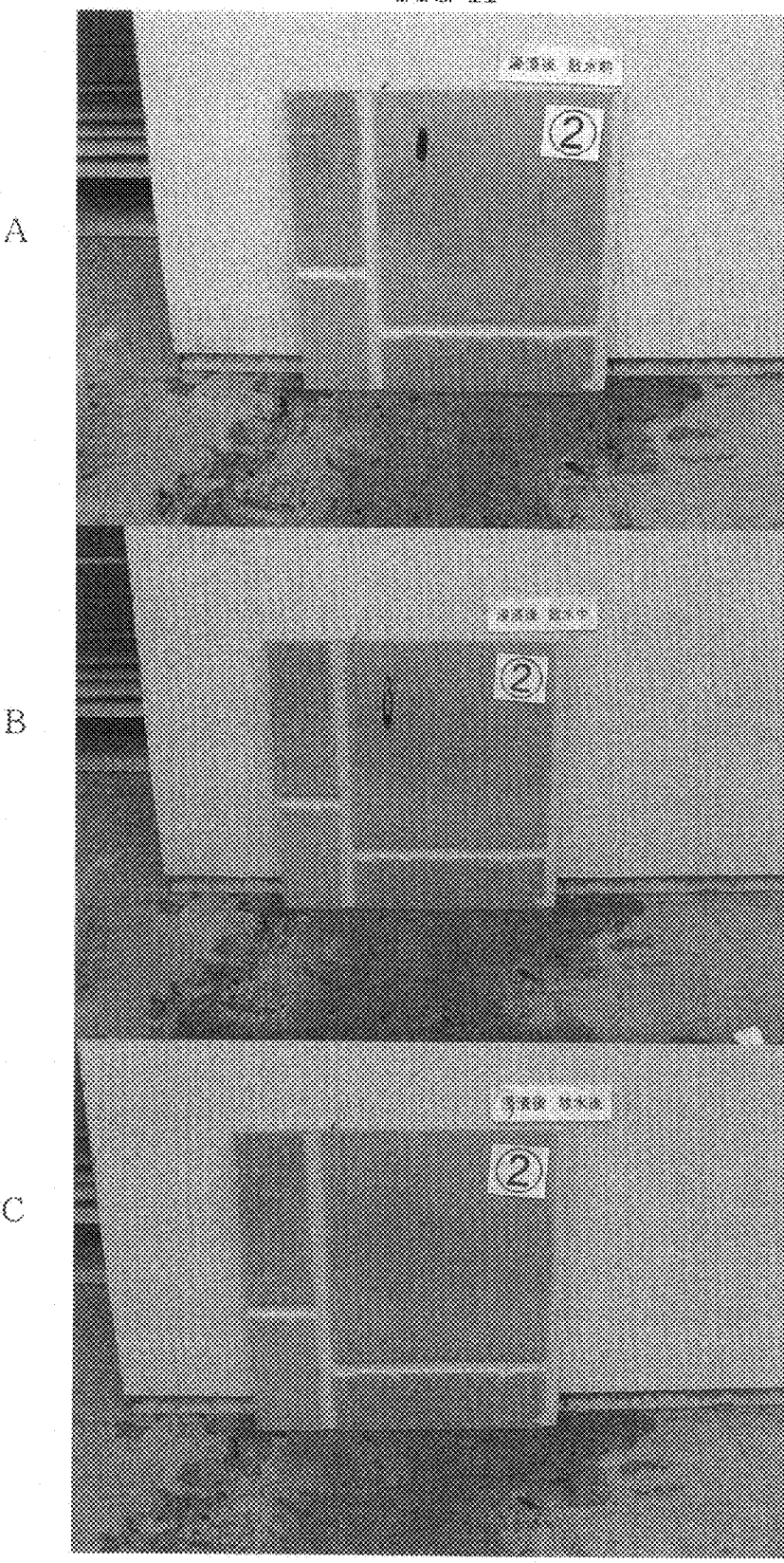
Figure 12:
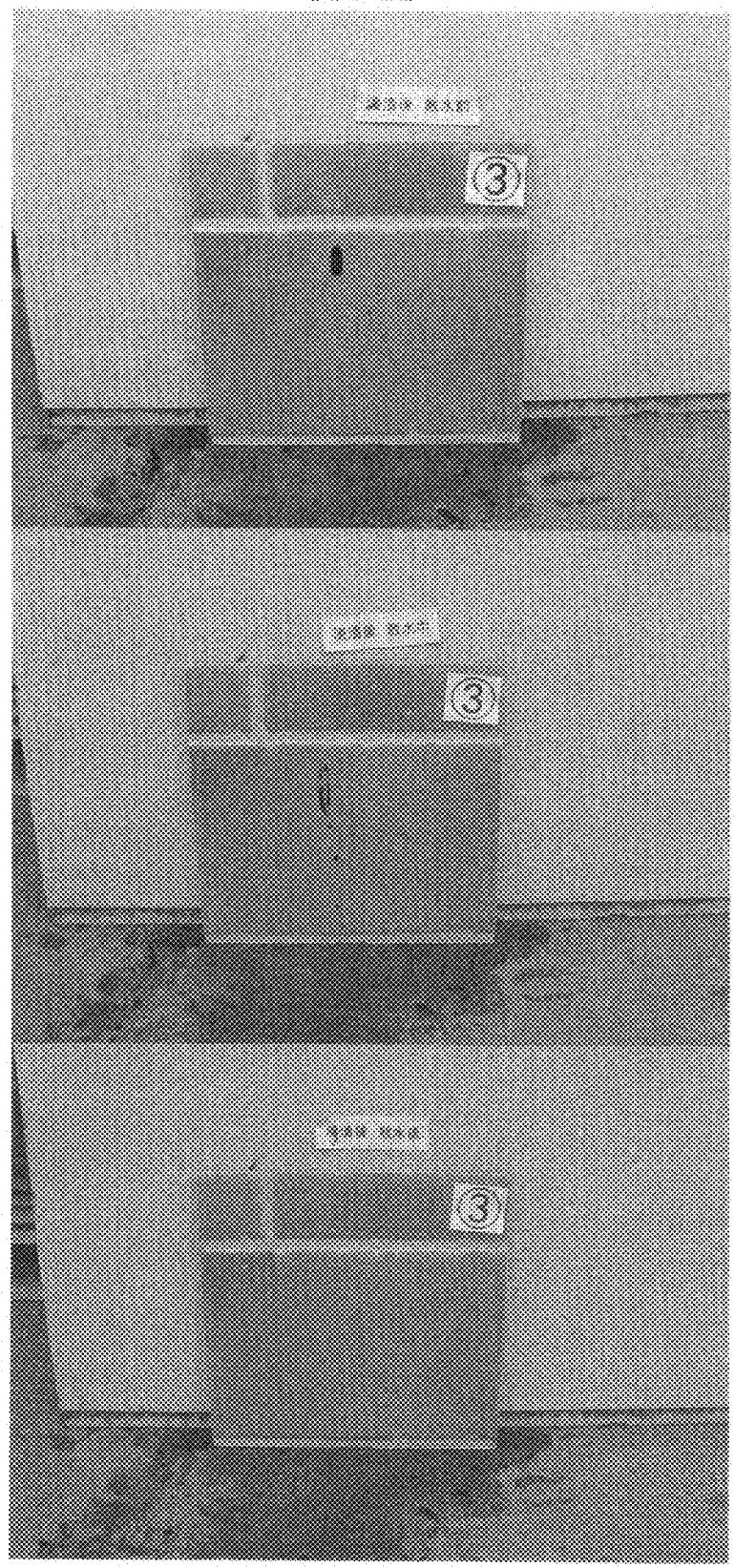
Figure 13:
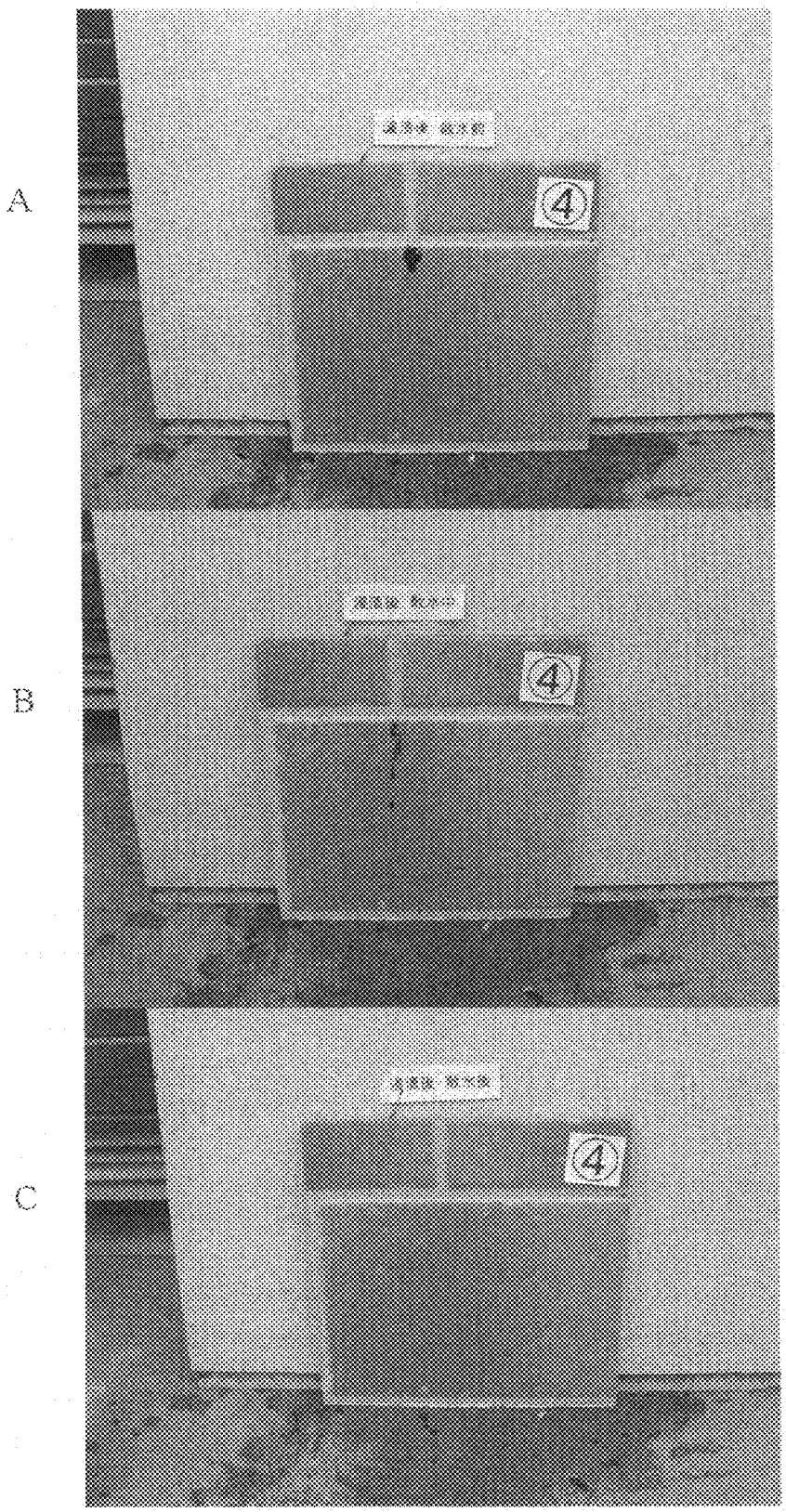
Figure 14:
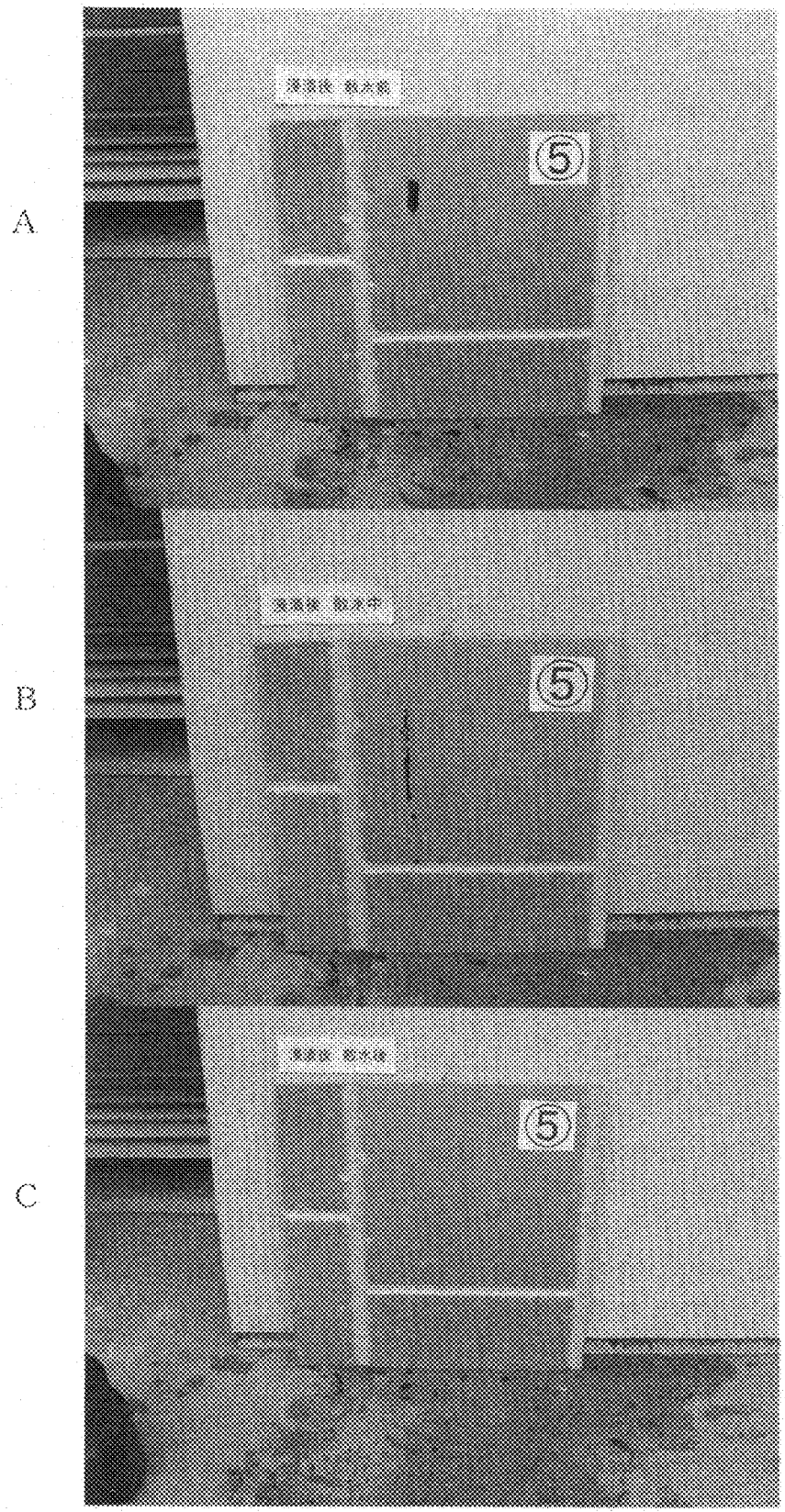
Figure 15:
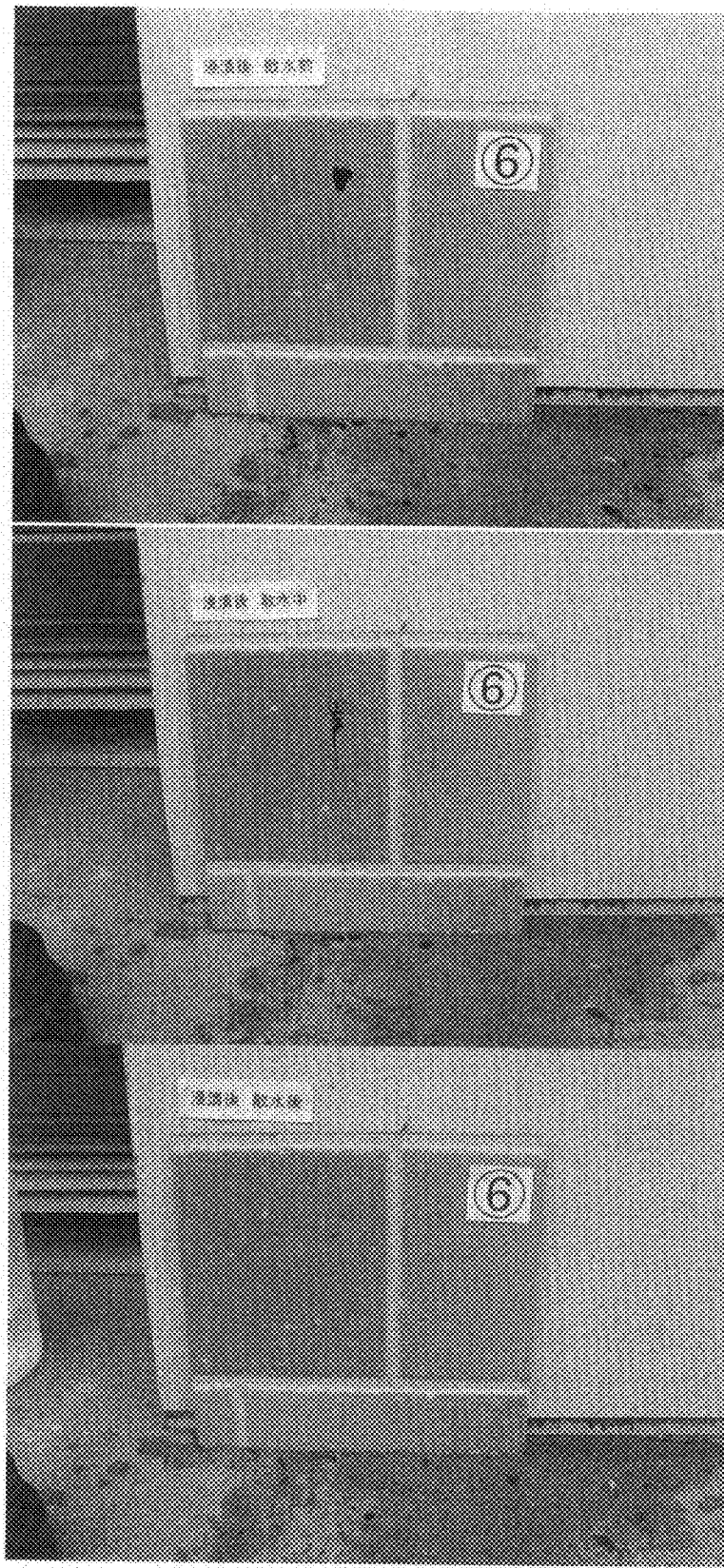
Figure 16:
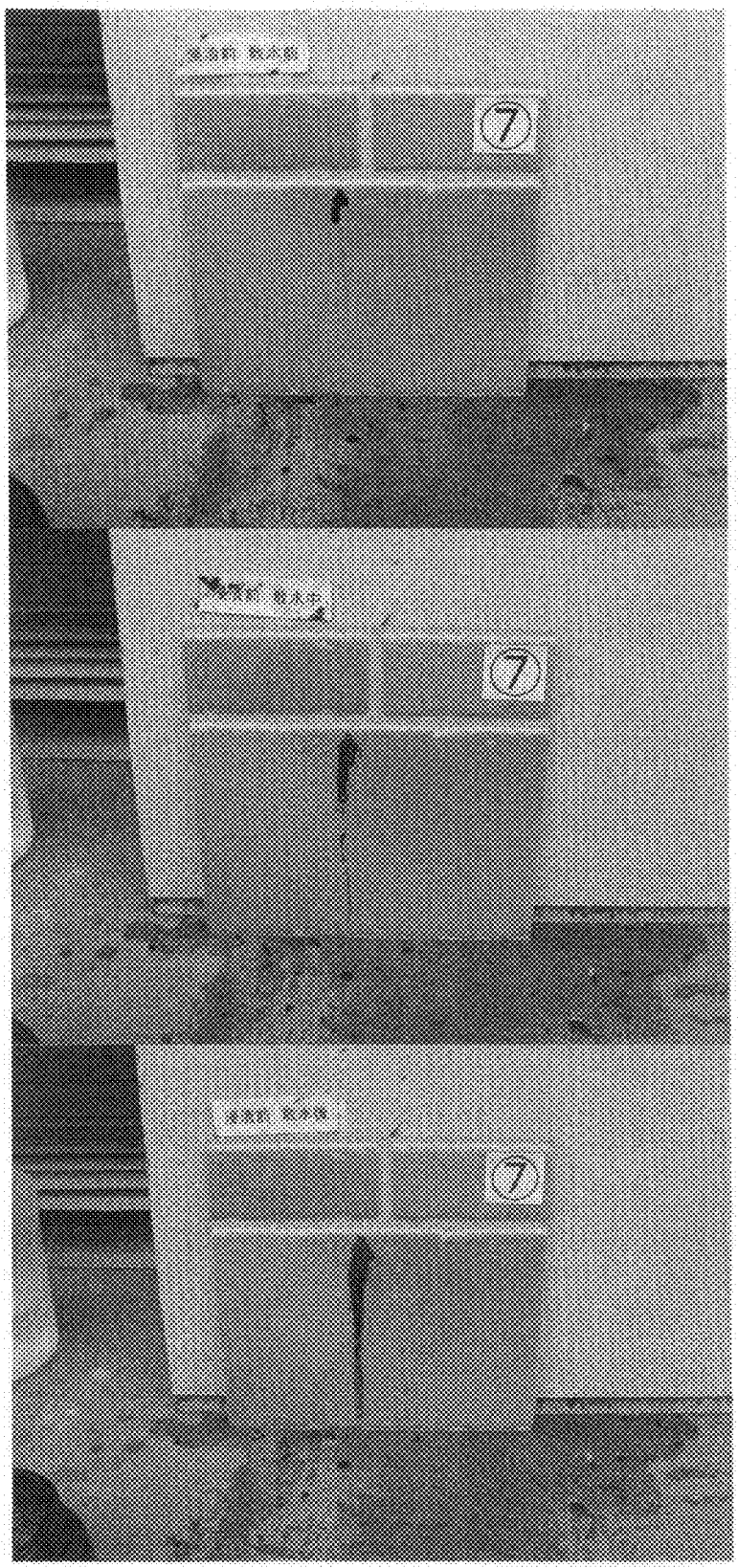
FIGS. 16-20 are photographs of building boards used in place of drawings to show the test results of the stain-proofing effects of comparisons (Samples 7-11) in Embodiment 2 according to the present invention. In each of the photographs, the mark A is a photograph of the board when it is applied with a stained liquid after application of a stain-proofing agent followed by immersion in water; the mark B is a photograph of the board during water-spraying to dirty parts of the board; and the mark C is a photograph of the board after water-spraying.
Figure 17:
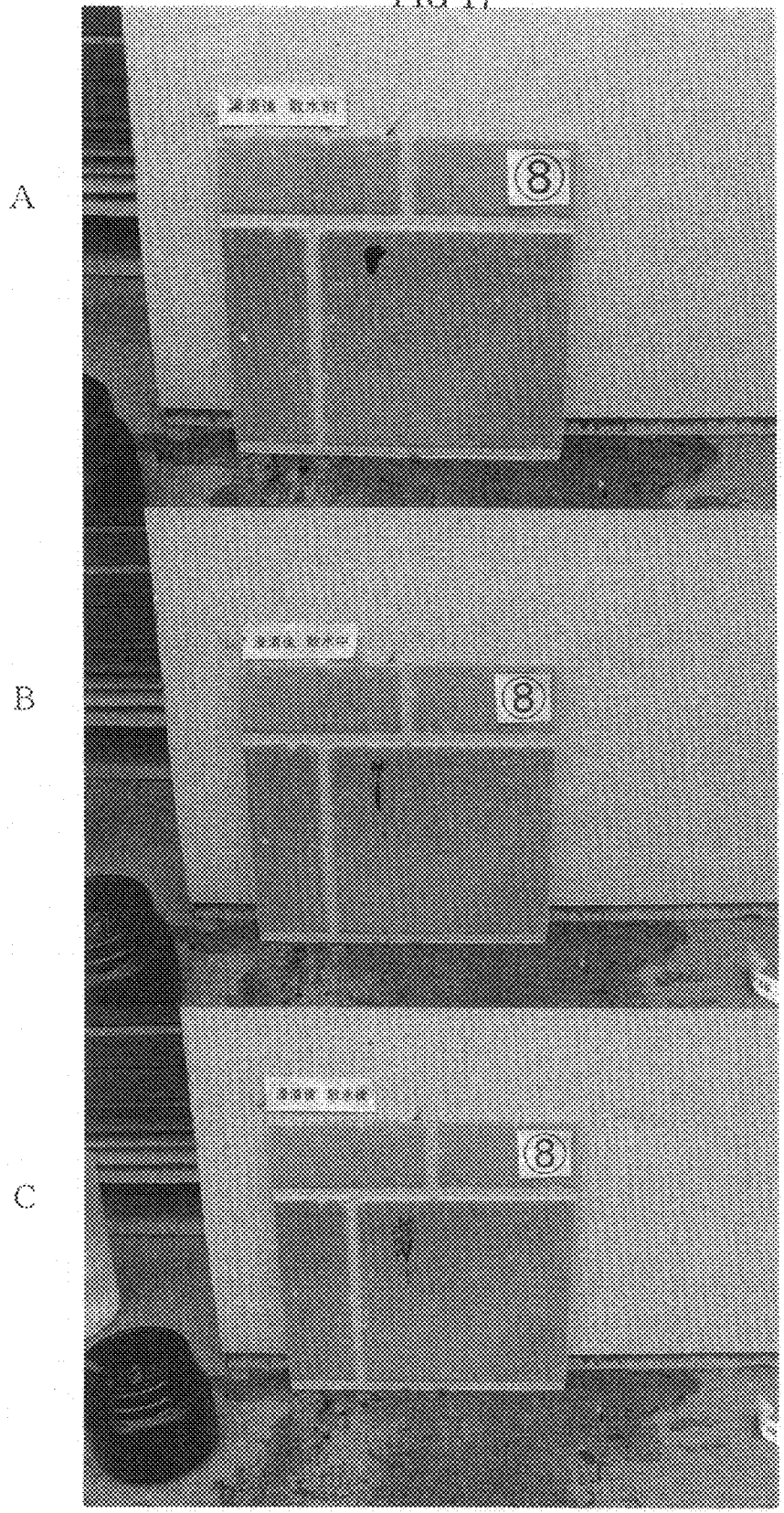
Figure 18:
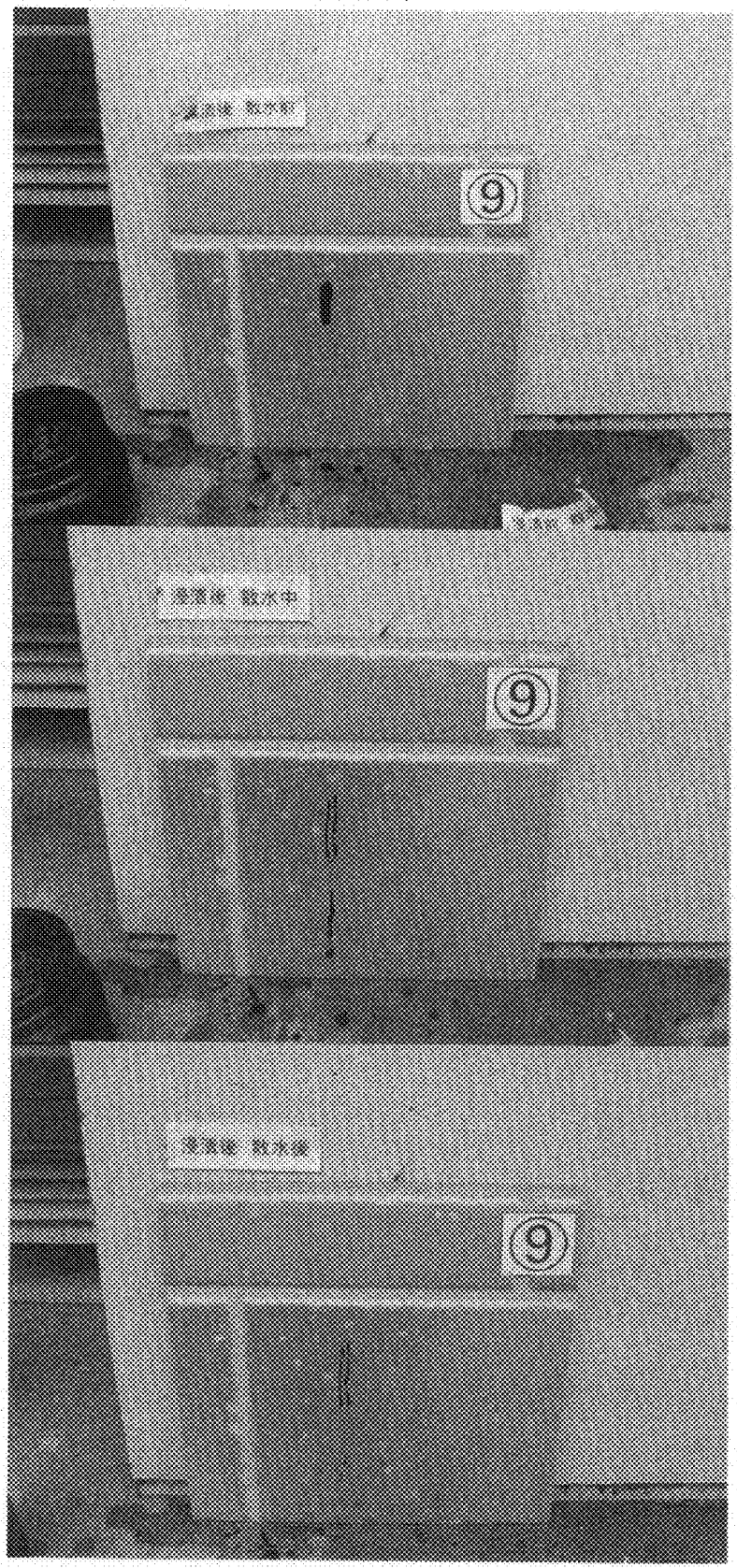
Figure 19:
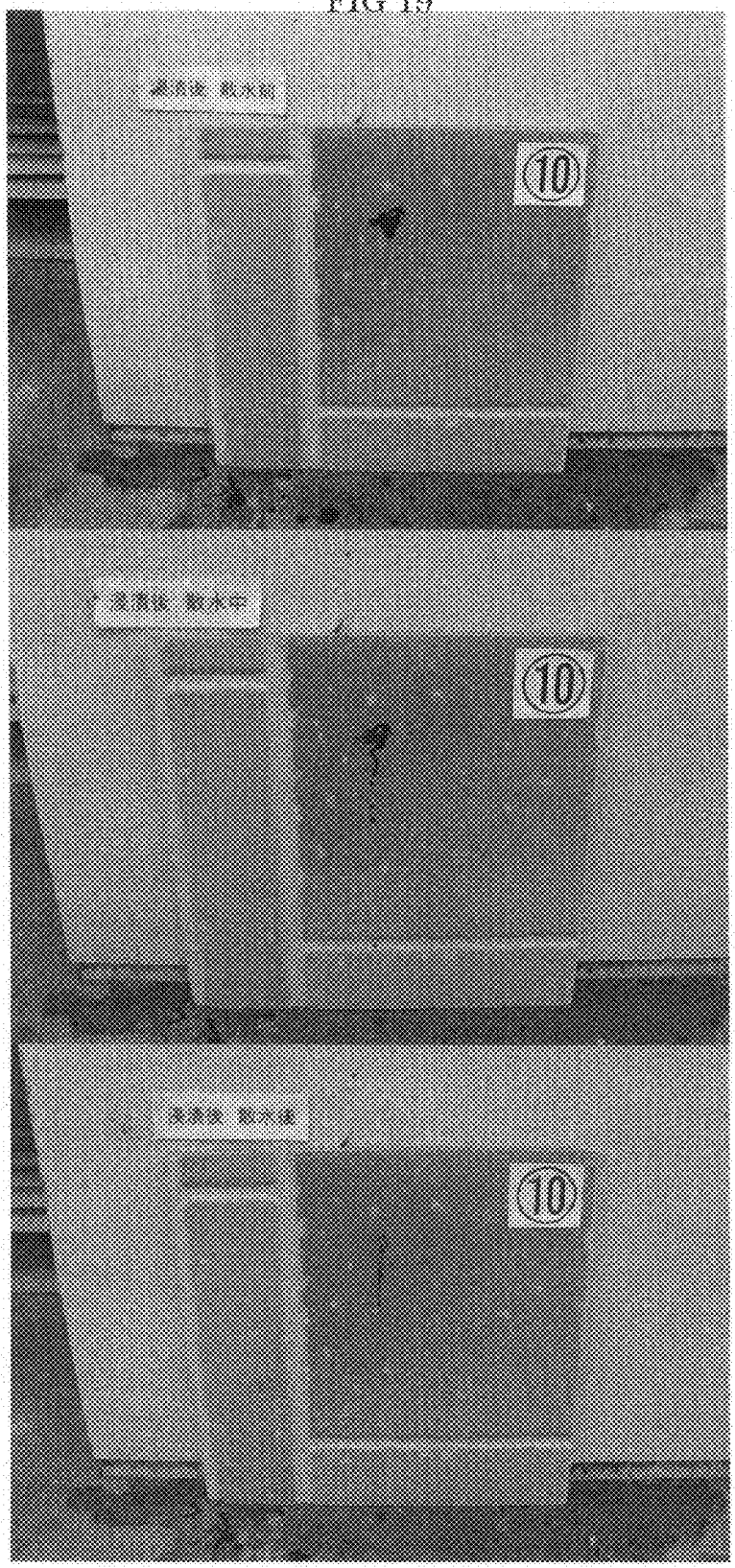
Figure 20:
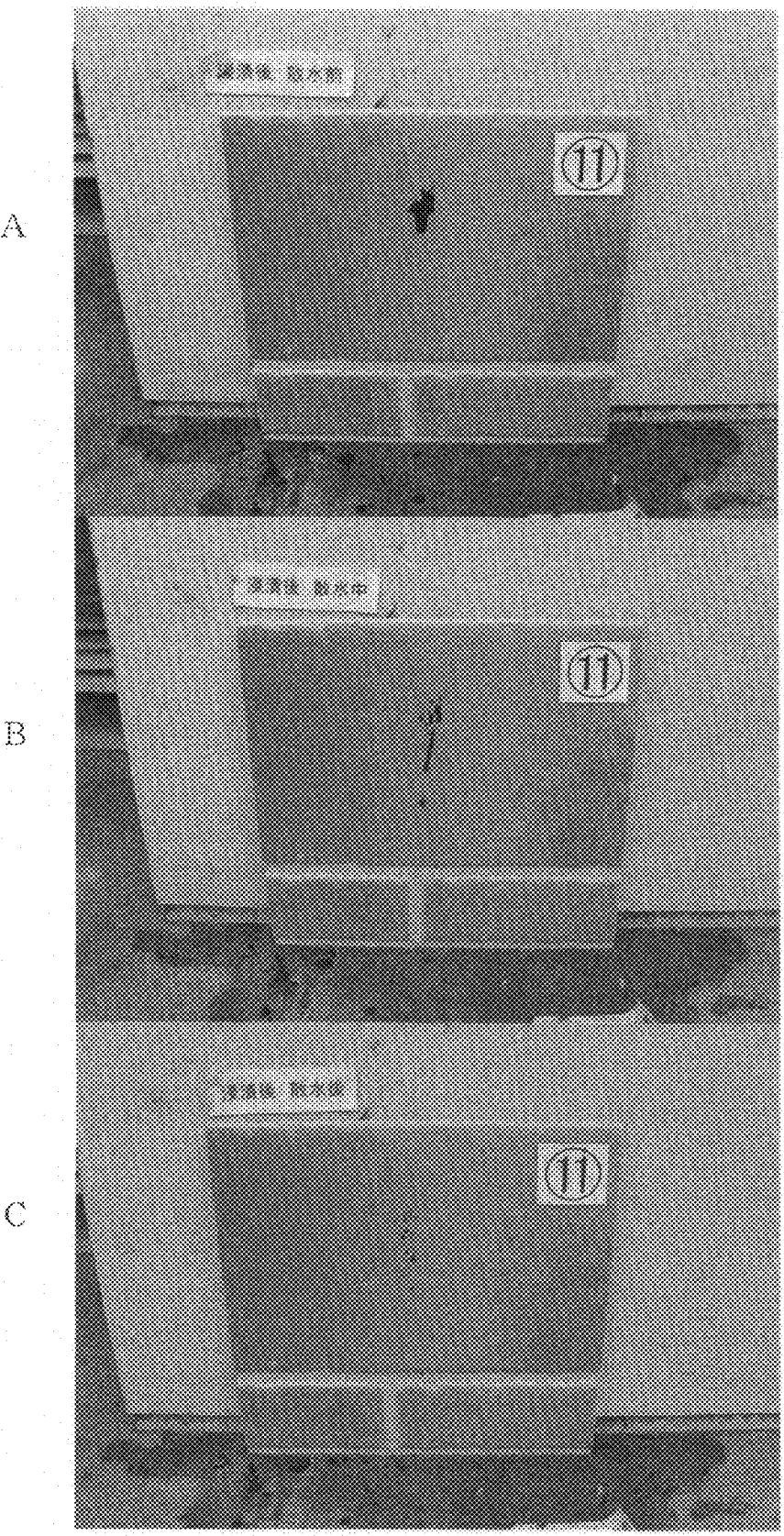
Figure 21:
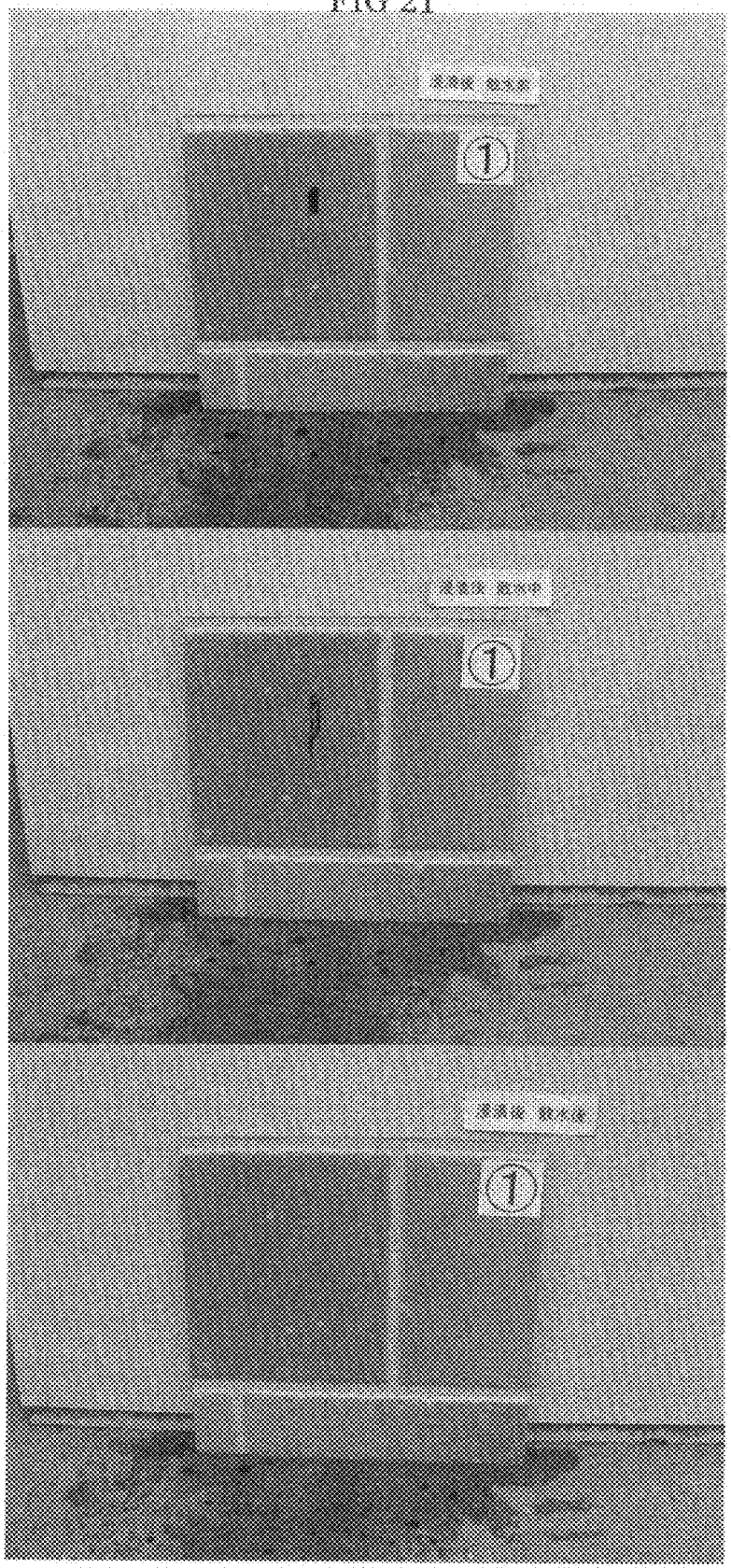
FIGS. 21-26 are photographs of building boards used in place of drawings to show the test results of the stain-proofing effect of examples (Samples 1-6) in Embodiment 3 according to the present invention. In each of the photographs, the mark A is a photograph of the board when it is applied with a stained liquid after application of a stain-proofing agent followed by immersion in water; the mark B is a photograph of the board during water-spraying to dirty parts of the board; and the mark C is a photograph of the board after water-spraying.
Figure 22:
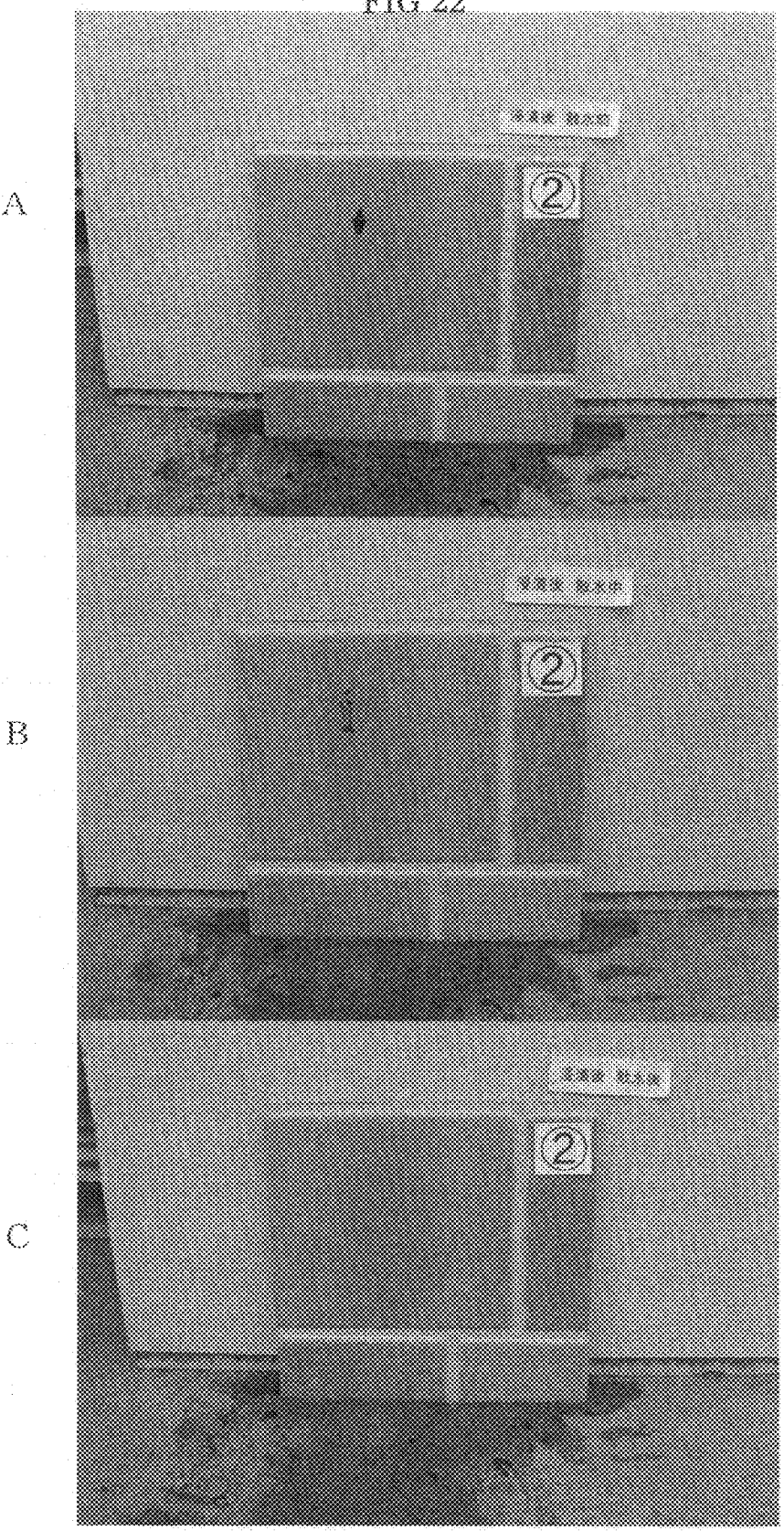
Figure 23:
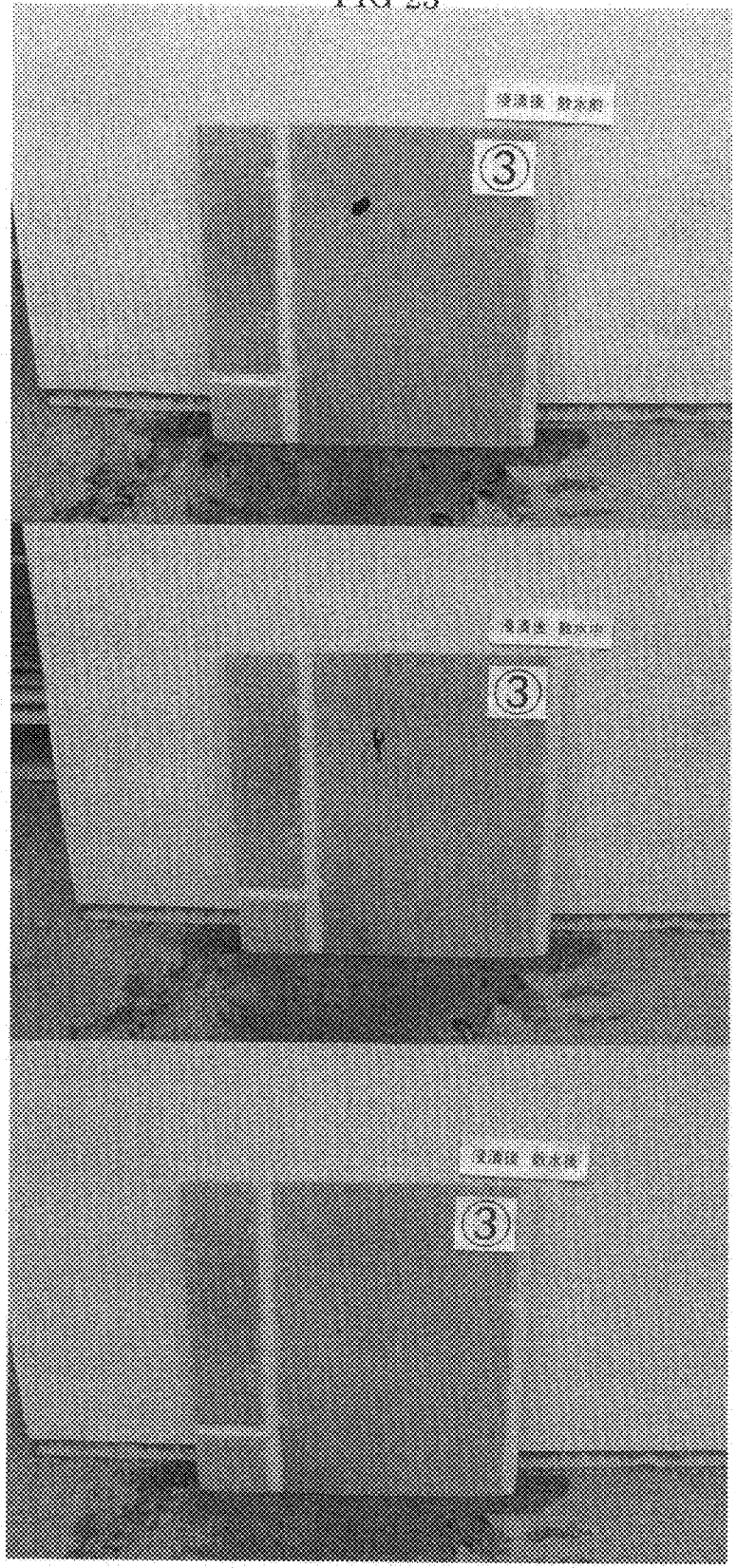
Figure 24:
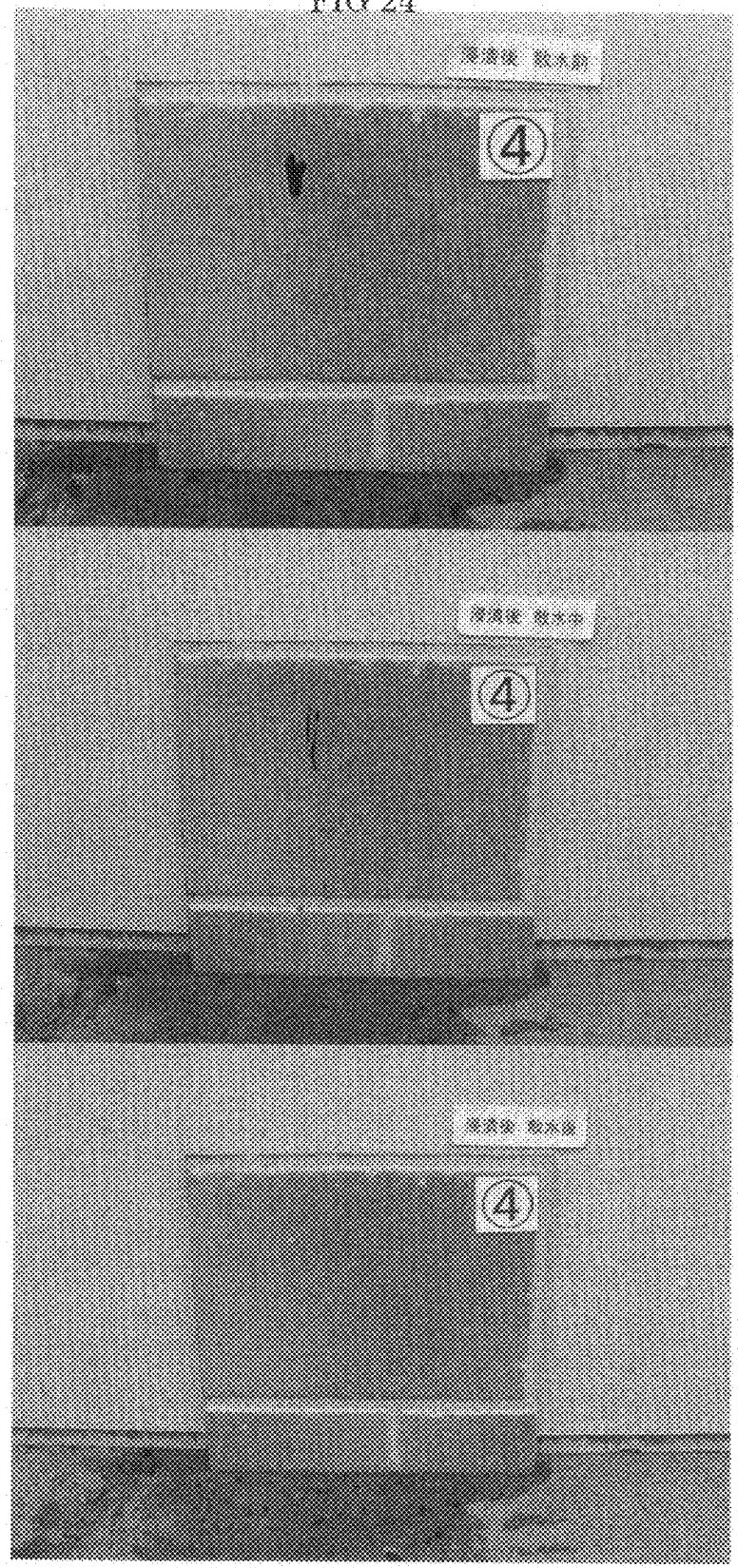
Figure 25:
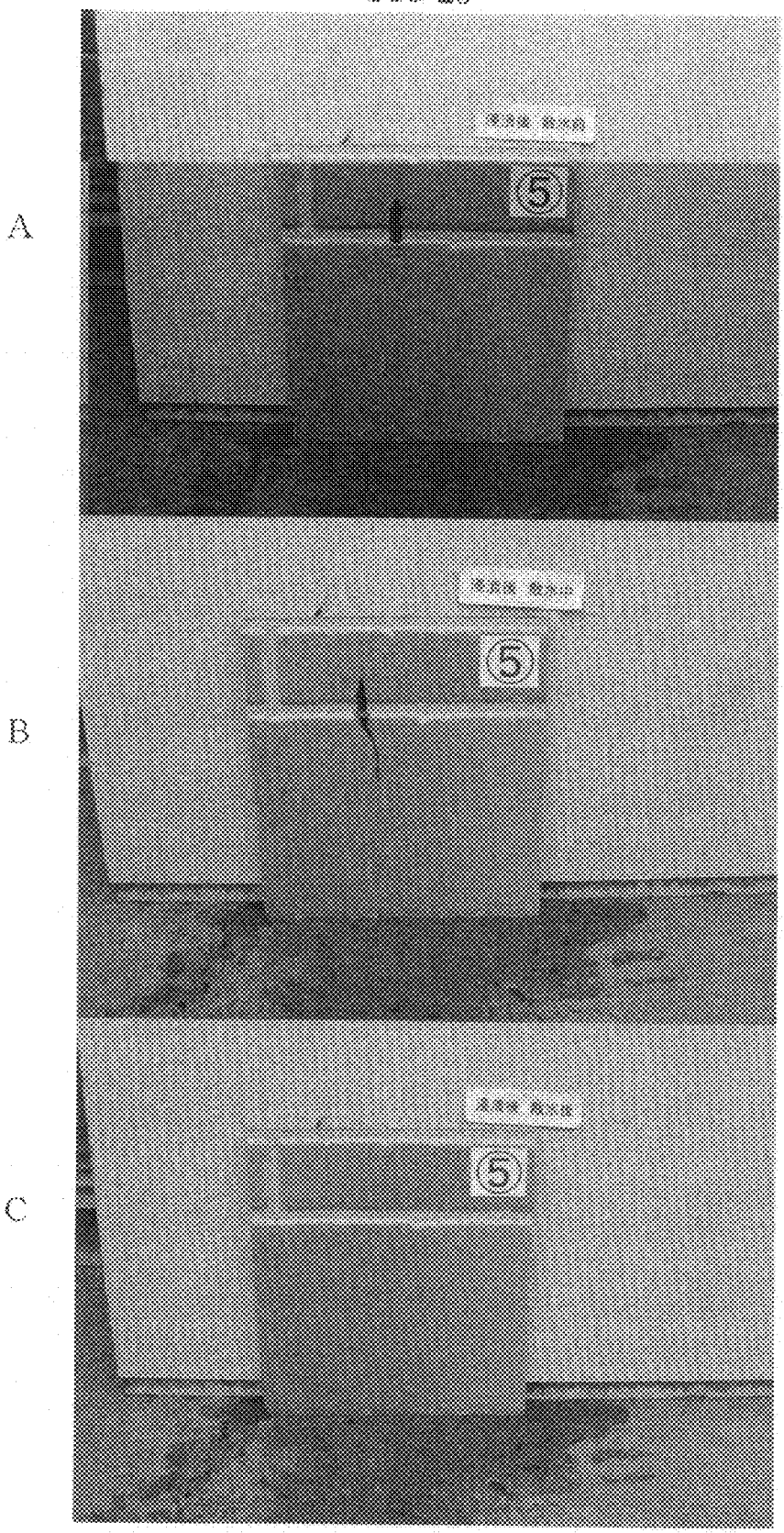
Figure 26:
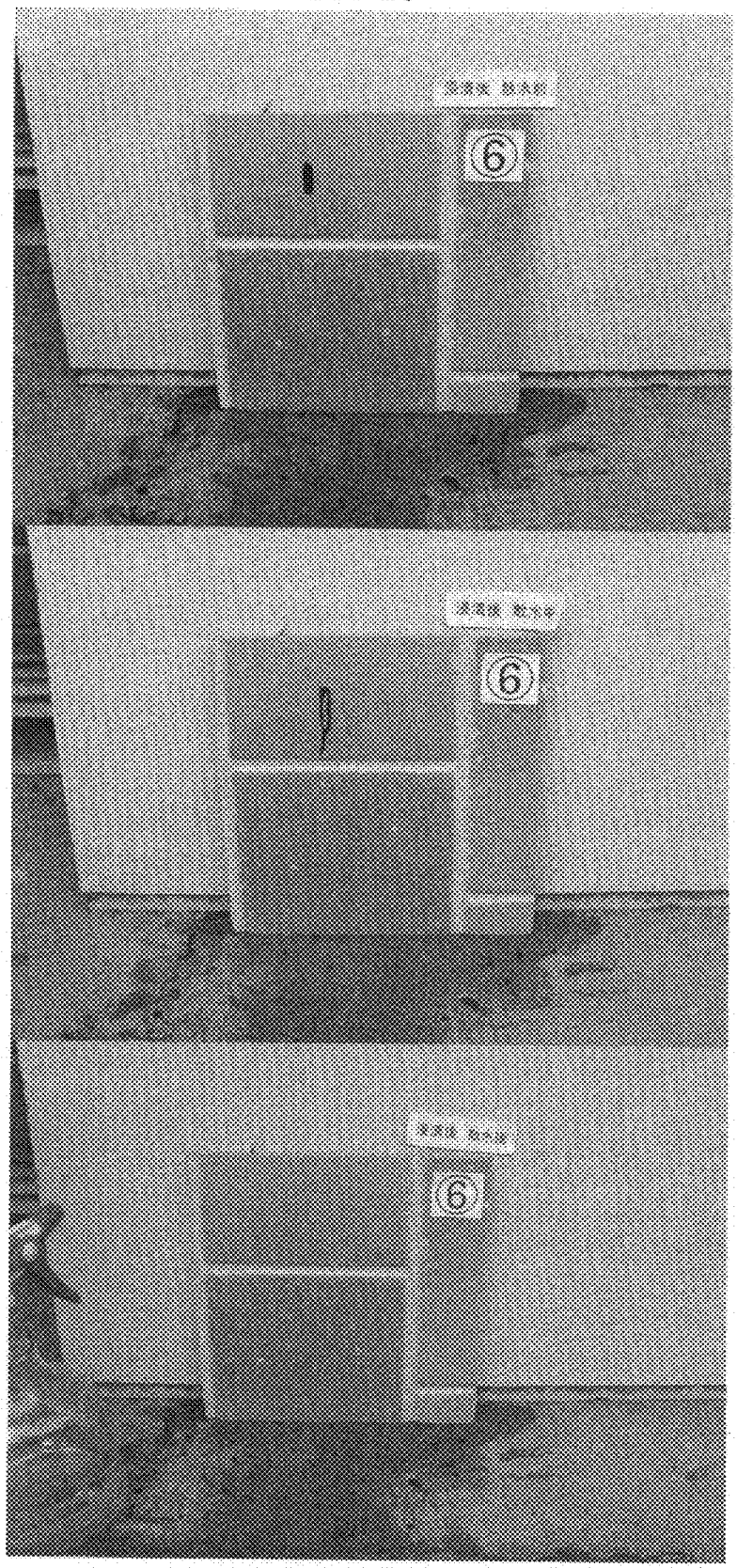
Figure 27:
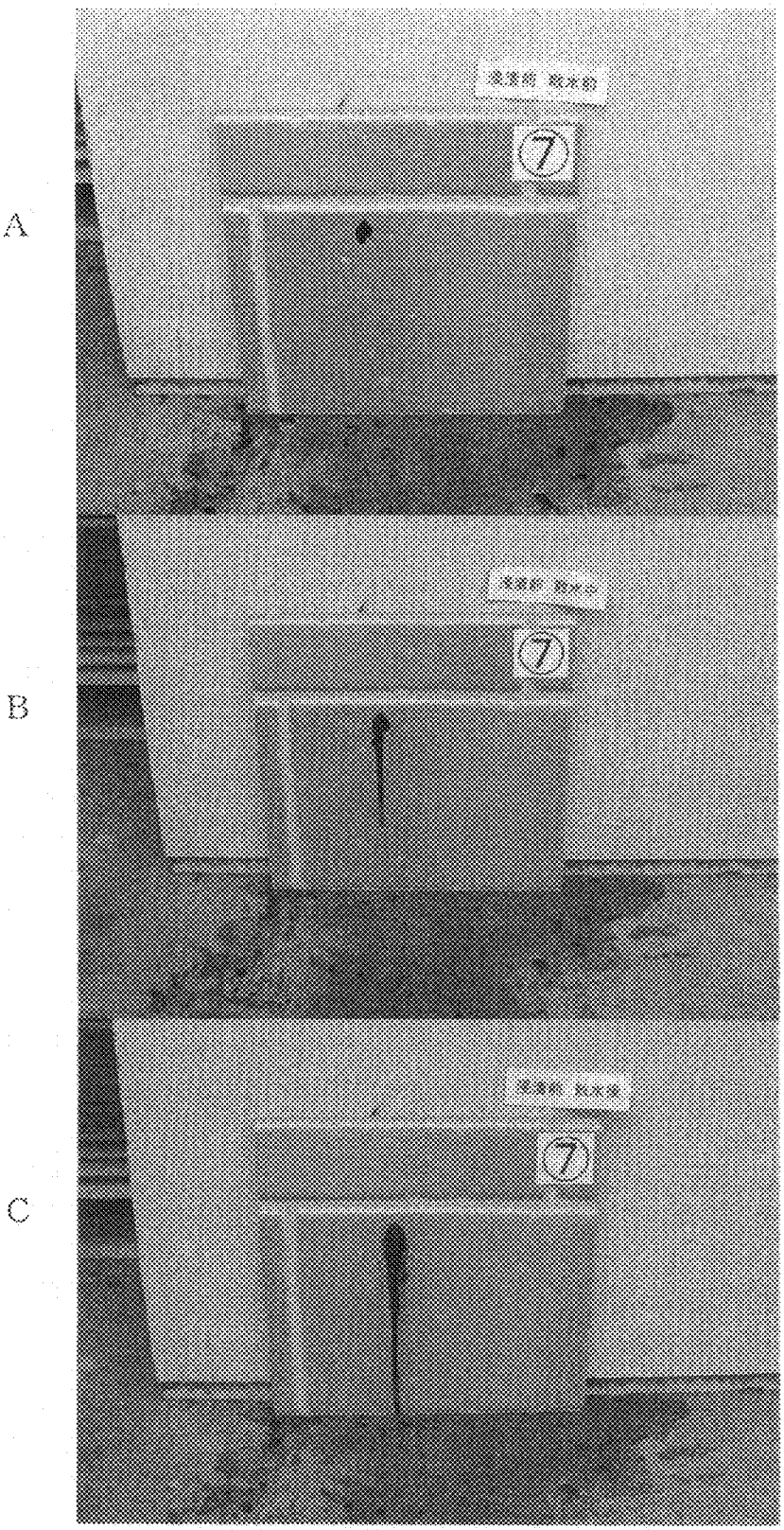
FIGS. 27-30 are photographs of building boards used in place of drawings to show the test results of the stain-proofing effects of comparisons (Samples 7-11) in Embodiment 3 according to the present invention. In each of the photographs, the mark A is a photograph of the board when it is applied with a stained liquid after application of a stain-proofing agent followed by immersion in water; the mark B is a photograph of the board during water-spraying to dirty parts of the board; and the mark C is a photograph of the board after water-spraying.
Figure 28:
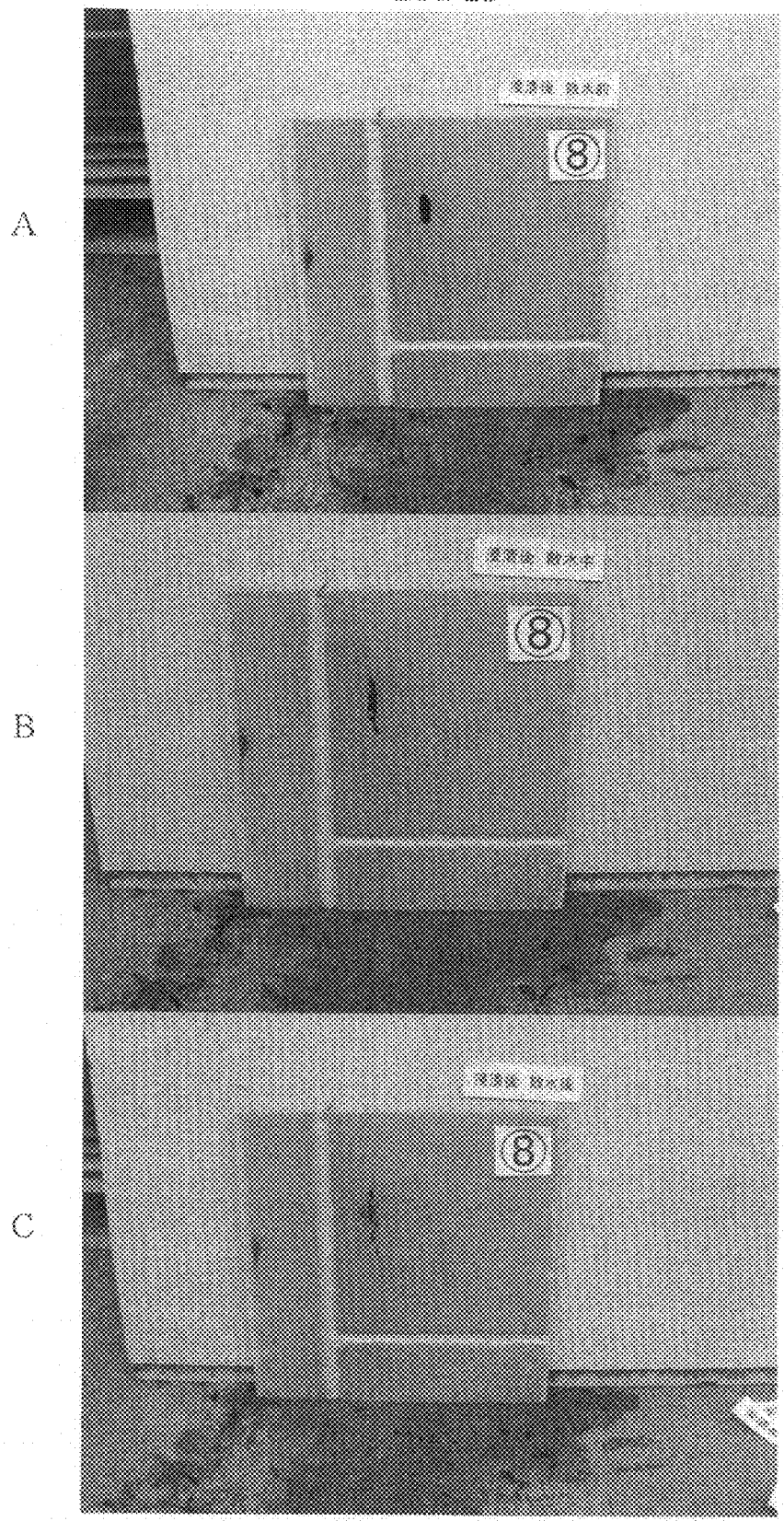
Figure 29:
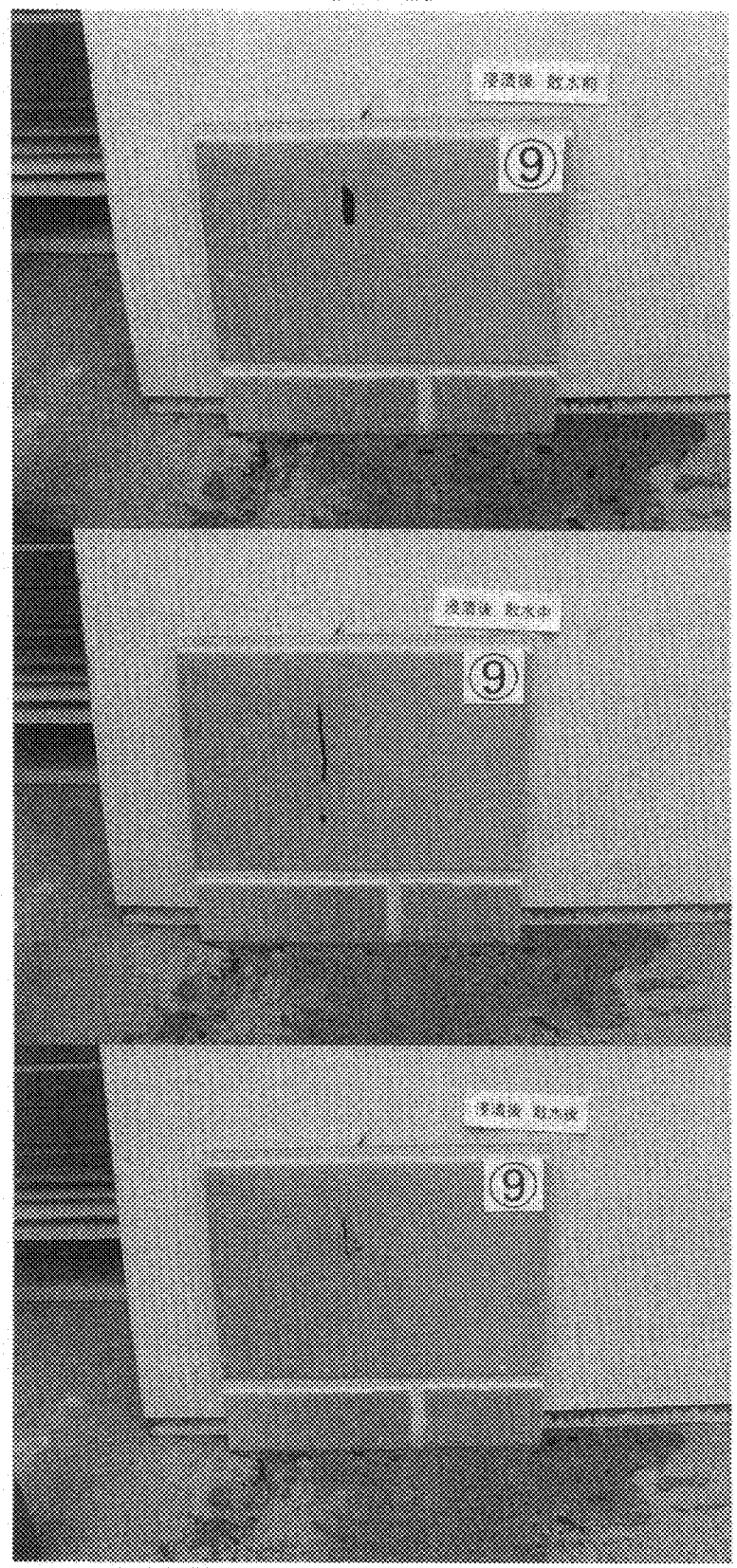
Figure 30:
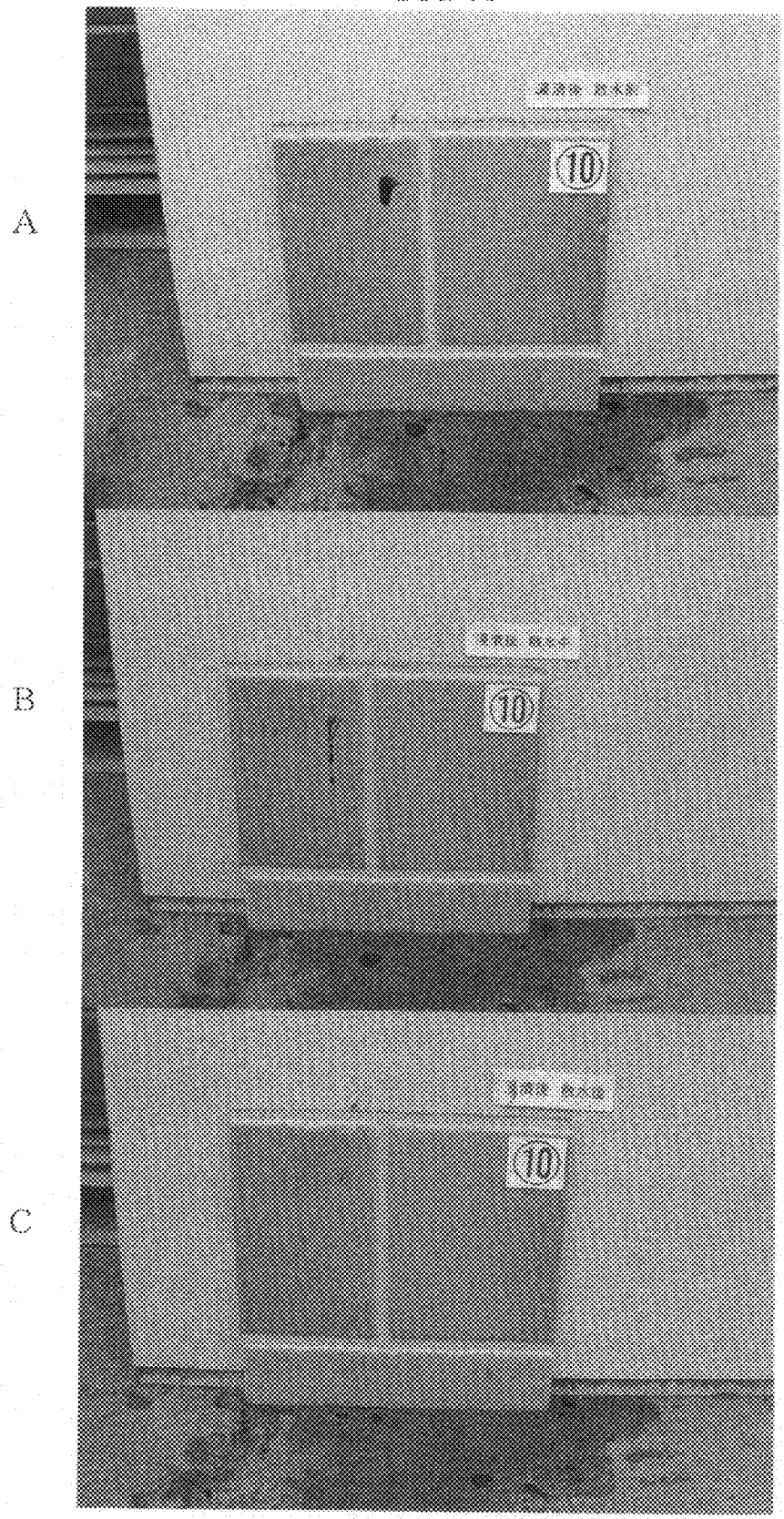

Sample 4 of the example in which 1% by mass of hydroxyapatite is added as a stain-proofing improver provides a test result "stain scarcely remains" after immersion in warm water as shown in Table 1 and FIG. 4, which indicates improvement in the stain-proofing property.

EXAMPLE 5

Sample 5 of the example in which 1% by mass of smectite is added as a stain-proofing improver provides a test result "stain scarcely remains" after immersion in warm water, which indicates improvement in the stain-proofing property.

EXAMPLE 6

Sample 6 of the example in which 1% by mass of calcium silicate is added as a stain-proofing improver and the amount of colloidal silica is 3% by mass provides a test result "stain somewhat remains" after immersion in warm water, which indicates somewhat improvement in the stain-proofing property.

EXAMPLE 7

Sample 7 of the example in which 1% by mass of calcium silicate is added as a stain-proofing improver and the amount of colloidal silica is 6% by mass provides a test result "stain scarcely remains" after immersion in warm water, which indicates improvement in the stain-proofing property.

EXAMPLE 8

Sample 8 of the example in which 1% by mass of calcium silicate is added as a stain-proofing improver and the amount of colloidal silica is 9% by mass provides a test result "stain scarcely remains" after immersion in warm water, which indicates improvement in the stain-proofing property.

Comparison 1

Sample 9 of the comparison in which a stain-proofing improver is not added provides a test result "stain remains" after immersion in warm water, showing inferior stain-proofing property compared with Samples Nos. 1-8 of the examples in which a stain-proofing improver is added.

Incidentally, all the samples exhibited favorable stain-proofing property before immersion in warm water. Thus, photographs in place of drawings showing the results of the stain-proofing test were omitted.

Embodiment 2

As Embodiment 2 according to the present invention, examples (Sample Nos. 1-6) and comparisons (Sample Nos. 7-11) are shown below.

The components shown in Table 2 were thrown into water to give a stain-proofing agent.

For dispersion of colloidal silica, a bead mill was used and then dispersion was further effected for 40 minutes using ultrasound wave.

Incidentally, a commercially available colloidal silica dispersion (e.g. SNOWTEX (trade name), manufactured by Nissan Chemical Industries, Ltd.) may be used instead of preparing a dispersion of colloidal silica in the manner as described above.

Onto the surface of a wood fiber-reinforced calcium silicate board (building board) of 50×40 mm was applied an aqueous styrene-acryl coating composition. While the coat thus formed was in an unhardened (undried) state, a stain-proofing agent having the composition shown in Table 2 was applied to the coat in an amount of 5 g/square shaku (about 5 g/sq. ft), and the coated board was dried by a dryer for use in a test.

The comparison (Sample No. 7) corresponds to a sample which was not applied with a stain-proofing agent.

A stain-proofing agent was similarly applied onto the coat after completely drying the coat in the comparisons (Sample Nos. 8-10) or 100 seconds after application of a coating composition in the comparison (Sample No. 11), and the resulting coated board was dried at normal temperature for use in a test.

The building board subjected to the treatment with the stain-proofing agent was allowed to stand for one day after application of the stain-proofing agent, immersed in warm water at 60° C. for ten days and was examined with regard to the stain-proofing effect before and after immersion in the warm water.

The stain-proofing effect was evaluated by applying a stained liquid which had been prepared by dispersing 1% by mass of carbon black in a machine oil to the stain-proofing agent-treated surface of the building board with an ink brush to stain the board, and then spraying water to the stained parts of the board to wash away the stains.

Evaluation criterion of the stain-proofing property is as follows:

o:stain scarcely remains

Δ:stain somewhat remains

×:stain remains.

The test results are shown in Table 2.

The photographs of the test results are shown in FIGS. 10-20.

TABLE 2

| Component (% by mass) | | Sample No. | | | | | | | | | | |
|---|---|---|---|---|---|---|---|---|---|---|---|---|
| | | Example | | | | | | Comparison | | | | |
| | | 1 | 2 | 3 | 4 | 5 | 6 | 7 | 8 | 9 | 10 | 11 |
| Colloidal silica (particle diameter: 5-20 μm) | | 3 | 6 | 9 | 3 | 6 | 9 | 0 | 3 | 6 | 9 | 6 |
| Dispersing agent* | | 1 | 1 | 1 | 1 | 1 | 1 | | 1 | 1 | 1 | 1 |
| Isopropyl alcohol | | | | | 5 | 5 | 5 | | | | | |
| Stain-proofing Property | Before immersion | O | O | O | O | O | O | X | O | O | O | O |
| | After immersion | O | O | O | O | O | O | — | X | X | Δ | Δ |

*Sodium laurylsulfonate

EXAMPLE 1

Sample 1 of the example which was applied with a stain-proofing agent containing 3% by mass of colloidal silica while the coat was in an undried state provides a test result "stain scarcely remains" after immersion in warm water, which indicates improvement of the board in the stain-proofing property.

EXAMPLE 2

Sample 2 of the example which was applied with a stain-proofing agent containing 6% by mass of colloidal silica while the coat was in an undried state provides a test result "stain scarcely remains" after immersion in warm water, which indicates improvement of the board in the stain-proofing property.

EXAMPLE 3

Sample 3 of the example which was applied with a stain-proofing agent containing 9% by mass of colloidal silica while the coat was in an undried state provides a test result "stain scarcely remains" after immersion in warm water, which indicates improvement of the board in the stain-proofing property.

EXAMPLE 4

Sample 4 of the example which was applied with a stain-proofing agent containing 3% by mass of colloidal silica and 5% by mass of isopropyl alcohol while the coat was in an undried state provides a test result "stain scarcely remains" after immersion in warm water, which indicates improvement of the board in the stain-proofing property.

EXAMPLE 5

Sample 5 of the example which was applied with a stain-proofing agent containing 6% by mass of colloidal silica and 5% by mass of isopropyl alcohol while the coat was in an undried state provides a test result "stain scarcely remains" after immersion in warm water, which indicates improvement of the board in the stain-proofing property.

EXAMPLE 6

Sample 6 of the example which was applied with a stain-proofing agent containing 9% by mass of colloidal silica and 5% by mass of isopropyl alcohol while the coat was in an undried state provides a test result "stain scarcely remains" after immersion in warm water, which indicates improvement of the board in the stain-proofing property.

Comparison 1

Sample 7 of the comparison which was not applied with a stain-proofing agent provides a test result "stain remains" even before immersion in warm water, showing poor stain-proofing property.

Comparison 2

Sample 8 of the comparison which was applied with a stain-proofing agent containing 3% by mass of colloidal silica after completely hardening the coat provides a test result "stain remains" after immersion in warm water, showing poor stain-proofing property.

Comparison 3

Sample 9 of the comparison which was applied with a stain-proofing agent containing 6% by mass of colloidal silica after completely hardening the coat provides a test result "stain remains" after immersion in warm water, showing poor stain-proofing property.

Comparison 4

Sample 10 of the comparison which was applied with a stain-proofing agent containing 9% by mass of colloidal silica after completely hardening the coat provides a test result "stain somewhat remains" after immersion in warm water, showing somewhat poor stain-proofing property.

Comparison 5

Sample 11 of the comparison which was applied with a stain-proofing agent containing 6% by mass of colloidal silica while the coat was in a semi-dried state provides a test result "stain somewhat remains" after immersion in warm water, showing somewhat poor stain-proofing property.

Incidentally, the stain-proofing test after immersion in warm water was not conducted on sample 7 of the comparison because the stain-proofing property of the sample before immersion in a warm water was poor.

In addition, all the samples except for sample 7 exhibited favorable stain-proofing property before immersion in warm water. Thus, photographs in place of drawings showing the results of the stain-proofing test were omitted.

Embodiment 3

As Embodiment 3 according to the present invention, examples (Sample Nos. 1-6) and comparisons (Sample Nos. 7-10) are shown below.

The components shown in Table 3 were thrown into water to give a stain-proofing agent.

For dispersion of colloidal silica, a bead mill was used and then dispersion was further effected for 40 minutes using ultrasound wave.

In the present invention, a commercially available colloidal silica dispersion (e.g. SNOWTEX (trade name), manufactured by Nissan Chemical Industries, Ltd.) may be used instead of preparing a dispersion of colloidal silica in the manner as described above.

Onto the surface of a wood fiber-reinforced calcium silicate board of 50×40 mm was applied an aqueous styrene-acryl coating composition. After the coat thus formed hardened, corona discharge treatment was conducted. Thereafter, a stain-proofing agent having the composition shown in Table 1 was applied to the coat in an amount of 5 g/square shaku (about 5 g/sq. ft), and the resulting coated board was dried at normal temperature for use in a test.

Onto the surface of a wood fiber-reinforced calcium silicate board (building board) of 50×40 mm was applied an aqueous styrene-acryl coating composition. While the coat thus formed was in an unhardened (undried) state, a stain-proofing agent having the composition shown in Table 3 was applied to the coat in an amount of 5 g/square shaku (about 5 g/sq. ft), and the resulting coated board was dried by a drier for use in a test.

The comparison (Sample No. 7) corresponds to a sample which was not applied with a stain-proofing agent.

In each of the comparisons (Sample Nos. 8-10), a stain-proofing agent was similarly applied after completely hardening (drying) the coat without effecting corona discharge treatment, and the resulting coated board was dried at normal temperature for use in a test.

A stain-proofing agent was applied to the thus formed coat after completely drying the coat in the comparisons (Sample Nos. 8-10) or 100 seconds after application of a coating composition in the comparison (Sample No. 11), and the resulting coated board was dried at normal temperature for use in a test.

In the examples, change of the surface of the board after corona charge treatment was visually observed.

The building board subjected to the treatment with the stain-proofing agent was allowed to stand for one day after the stain-proofing treatment, immersed in warm water at 60° C. for ten days and was examined with regard to stain-proofing effect before and after immersion in the warm water.

Stain-proofing effect was evaluated by applying a stained liquid which had been prepared by dispersing 1% by mass of carbon black in a machine oil to the stain-proofing agent-treated surface of the building board with an ink brush to stain the board, and then spraying water to the stained parts of the board to wash away the stains.

Evaluation criterion of the stain-proofing property is as follows:

o: stain scarcely remains
Δ: stain somewhat remains
×: stain remains.

The test results are shown in Table 3 and the photographs are shown in FIGS. 21-30.

TABLE 3

| Component | | Sample No. | | | | | | | | | |
|---|---|---|---|---|---|---|---|---|---|---|---|
| | | Example | | | | | | Comparison | | | |
| (% by mass) | | 1 | 2 | 3 | 4 | 5 | 6 | 7 | 8 | 9 | 10 |
| Colloidal silica (particle diameter: 5-20 μm) | | 3 | 6 | 9 | 3 | 6 | 9 | 0 | 3 | 6 | 9 |
| Dispersing agent* | | 1 | 1 | 1 | 1 | 1 | 1 | | 1 | 1 | 1 |
| Isopropyl alcohol | | | | | 5 | 5 | 5 | | | | |
| Change in appearance after corona discharge treatment | | Almost no | Almost no | Almost no | Almost no | Almost no | Almost no | — | — | — | — |
| Stain-proofing Property | Before immersion | ○ | ○ | ○ | ○ | ○ | ○ | X | ○ | ○ | ○ |
| | After immersion | ○ | ○ | ○ | ○ | ○ | ○ | — | X | X | Δ |

*Sodium laurylsulfonate

EXAMPLE 1

Sample 1 of the example which was applied with a stain-proofing agent containing 3% by mass of colloidal silica after corona discharge treatment provides a test result "stain scarcely remains" after immersion in warm water, which indicates improvement of the board in the stain-proofing property.

It is recognized that the appearance of the surface of the board is almost not changed even through corona discharge treatment.

EXAMPLE 2

Sample 2 of the example which was applied with a stain-proofing agent containing 6% by mass of colloidal silica after corona discharge treatment provides a test result "stain scarcely remains" after immersion in warm water, which indicates improvement of the board in the stain-proofing property.

It is recognized that the appearance of the surface of the board is almost not changed even through corona discharge treatment.

EXAMPLE 3

Sample 3 of the example which was applied with a stain-proofing agent containing 9% by mass of colloidal silica after corona discharge treatment provides a test result "stain scarcely remains" after immersion in warm water, which indicates improvement of the board in the stain-proofing property.

It is recognized that the appearance of the surface of the board is almost not changed even through corona discharge treatment.

EXAMPLE 4

Sample 4 of the example which was applied with a stain-proofing agent containing 3% by mass of colloidal silica and 5% by mass of isopropyl alcohol after corona discharge treatment provides a test result "stain scarcely remains" after immersion in warm water, which indicates improvement of the board in the stain-proofing property.

It is recognized that the appearance of the surface of the board is almost not changed even through corona discharge treatment.

EXAMPLE 5

Sample 5 of the example which was applied with a stain-proofing agent containing 6% by mass of colloidal silica and 5% by mass of isopropyl alcohol after corona discharge treatment provides a test result "stain scarcely remains" after immersion in warm water, which indicates improvement of the board in the stain-proofing property.

It is recognized that the appearance of the surface of the board is almost not changed even through corona discharge treatment.

EXAMPLE 6

Sample 6 of the example which was applied with a stain-proofing agent containing 9% by mass of colloidal silica and 5% by mass of isopropyl alcohol after corona discharge treatment provides a test result "stain scarcely remains" after immersion in warm water, which indicates improvement of the board in the stain-proofing property.

It is recognized that the appearance of the surface of the board is almost not changed even through corona discharge treatment.

Comparison 1

Sample 7 of the comparison which was not applied with a stain-proofing agent provides a test result "stain remains" even before immersion in warm water, showing poor stain-proofing property.

Comparison 2

Sample 8 of the comparison which was applied with a stain-proofing agent containing 3% by mass of colloidal silica without subjecting to corona discharge treatment provides a test result "stain remains" after immersion in warm water, showing poor stain-proofing property.

Comparison 3

Sample 9 of the comparison which was applied with a stain-proofing agent containing 6% by mass of colloidal silica without subjecting to corona discharge treatment provides a test result "stain remains" after immersion in warm water, showing poor stain-proofing property.

Comparison 4

Sample 10 of the comparison which was applied with a stain-proofing agent containing 9% by mass of colloidal silica without subjecting to corona discharge treatment provides a test result "stain somewhat remains" after immersion in warm water, showing somewhat poor stain-proofing property.

Incidentally, the stain-proofing test after immersion in warm water was not effected on Sample 7 of the comparison because the stain-proofing property of this sample was poor even before immersion in warm water.

What is claimed is:

1. A stain-proofing agent which comprises silica fine particles, an aqueous solvent, and additionally a stain-proofing improver selected from the group consisting of hydroxyapatite, a mixture of hydroxyapatite and lithium metasilicate, and a mixture of hydroxyapatite and magnesium silicate.

2. The stain-proofing agent according to claim 1, further comprising a dispersing agent.

3. The stain-proofing agent according to claim 1, wherein the aqueous solvent is a mixture of water and an alcohol; wherein the alcohol is selected from the group consisting of methanol, ethanol, and isopropanol.

4. A building board comprising a substrate, a coat and a super hydrophilic stain-proofing film, wherein the coat is formed by applying a coating composition onto the surface of the substrate and the super hydrophilic stain-proofing film is formed by applying a stain-proofing agent onto the coat while the coat is in an unhardened state, wherein the stain-proofing agent comprises silica fine particles, an aqueous solvent, and additionally a stain-proofing improver selected from the group consisting of hydroxyapatite, a mixture of hydroxyapatite and lithium metasilicate, and a mixture of hydroxyapatite and magnesium silicate;

wherein the silica fine particles in the stain-proofing agent slightly gets into the coat.

5. A building board comprising a substrate, a coat and a super hydrophilic stain-proofing film, wherein the coat is formed by applying a coating composition onto the surface of the substrate and the super hydrophilic stain-proofing film is formed by applying a stain-proofing agent onto the coat after the coat is subjected to a roughening treatment, wherein the stain-proofing agent comprises silica fine particles, an aqueous solvent, and additionally a stain-proofing improver selected from the group consisting of hydroxyapatite, a mixture of hydroxyapatite and lithium metasilicate, and a mixture of hydroxyapatite and magnesium silicate.

6. The building board according to claim 4, wherein, the stain-proofing agent further comprises a dispersing agent.

7. The building board according to claim 4, wherein the aqueous solvent is a mixture of water and an alcohol; wherein the alcohol is selected from the group consisting of methanol, ethanol, and isopropanol.

8. The building board according to claim 5, wherein the stain-proofing agent further comprises a dispersing agent.

9. The building board according to claim 5, wherein the aqueous solvent is a mixture of water and an alcohol; wherein the alcohol is selected from the group consisting of methanol, ethanol, and isopropanol.

* * * * *